(12) United States Patent
Mosbarger et al.

(10) Patent No.: US 6,947,974 B2
(45) Date of Patent: *Sep. 20, 2005

(54) METHOD AND SYSTEM FOR ASYMMETRIC SATELLITE COMMUNICATIONS FOR LOCAL ARE NETWORKS WHEREIN THE SERVER BEING PROGRAMMED TO ROUTE THE DOWNLOADED DATA TO CLIENT COMPUTERS IRRESPECTIVE OF THE CLIENT COMPUTER'S OPERATING SYSTEMS

(75) Inventors: Myron Mosbarger, Orem, UT (US); John K. Thomasson, Sandy, UT (US)

(73) Assignee: Helius, Inc, Lindon, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/815,520

(22) Filed: Mar. 23, 2001

(65) Prior Publication Data
US 2002/0032801 A1 Mar. 14, 2002

Related U.S. Application Data

(63) Continuation of application No. 09/746,438, filed on Dec. 20, 2000, which is a continuation of application No. 08/943,544, filed on Oct. 3, 1997, now Pat. No. 6,205,473.

(51) Int. Cl.$^7$ .............................................. G06F 15/16
(52) U.S. Cl. ...................... 709/217; 709/203; 709/238
(58) Field of Search ................................ 709/203, 217, 709/219, 238; 370/404

(56) References Cited

U.S. PATENT DOCUMENTS

| | | | |
|---|---|---|---|
| 5,095,480 A | 3/1992 | Fenner | |
| 5,379,296 A | 1/1995 | Johnson et al. | |
| 5,423,002 A | 6/1995 | Hart | |
| 5,488,412 A | 1/1996 | Majeti et al. | |
| 5,519,699 A | 5/1996 | Ohsawa | |
| 5,534,913 A | 7/1996 | Majeti et al. | |
| 5,539,736 A | 7/1996 | Johnson et al. | |
| 5,541,911 A | 7/1996 | Nilakantan et al. | |
| 5,541,927 A | 7/1996 | Kristol et al. | |
| 5,555,244 A | 9/1996 | Gupta et al. | |
| 5,583,997 A | 12/1996 | Hart | |
| 5,586,121 A | * 12/1996 | Moura et al. ............... | 370/404 |

(Continued)

Primary Examiner—Bharat Barot
Assistant Examiner—Philip B. Tran
(74) Attorney, Agent, or Firm—Lloyd W. Sadler

(57) ABSTRACT

A method and system for providing high-speed, satellite-based information delivery is described. Improved communication channel efficiency is accomplished by employing an asymmetric data flow. The high bandwidth channel capacity of digital satellite systems is used for the download of large volumes of data. While relatively low speed communication channels are used for upstream data requests. The use of separate channels for upstream data and downloaded data provides an increased efficiency of use for typical internet and other electronic information service subscribers. A typical user in such systems generally makes relatively short information requests. These requests are then followed by large amounts of information being transferred to the user's computer in response to the request. The volume of data being downloaded often causes a capacity overload of typically used land lines. This invention solves this problem, without becoming prohibitively expensive, by employing digital satellite dish receivers to receive the high volume of downloaded data and using the relatively low speed communication channels low volume upstream requests. Moreover, this invention is designed to interface with all common communication devices as well as being designed to operate on and with all common computing platforms.

44 Claims, 20 Drawing Sheets

Microfiche Appendix Included
(3 Microfiche, 150 Pages)

U.S. PATENT DOCUMENTS

| | | | |
|---|---|---|---|
| 5,594,490 A * | 1/1997 | Dawson et al. | 370/394 |
| 5,594,872 A | 1/1997 | Kawano et al. | |
| 5,610,910 A | 3/1997 | Focsaneanu et al. | |
| 5,610,920 A | 3/1997 | Doll et al. | |
| 5,631,907 A | 5/1997 | Guarneri et al. | |
| 5,659,692 A | 8/1997 | Poggio et al. | |
| 5,668,857 A | 9/1997 | McHale | |
| 5,673,265 A | 9/1997 | Gupta et al. | |
| 5,726,984 A | 3/1998 | Kubler et al. | |
| 5,742,829 A * | 4/1998 | Davis et al. | 717/178 |
| 5,771,354 A | 6/1998 | Crawford | |
| 5,818,845 A | 10/1998 | Moura et al. | |
| 5,828,655 A | 10/1998 | Moura et al. | |
| 5,835,726 A | 11/1998 | Shwed et al. | |
| 5,852,721 A | 12/1998 | Dillon et al. | |
| 5,987,506 A * | 11/1999 | Carter et al. | 709/213 |
| 5,995,726 A * | 11/1999 | Dillon | 709/217 |
| 6,085,235 A * | 7/2000 | Clarke, Jr. et al. | 709/219 |
| 6,101,180 A * | 8/2000 | Donahue et al. | 370/352 |
| 6,105,060 A * | 8/2000 | Rothblatt | 709/219 |
| 6,377,561 B1 * | 4/2002 | Black et al. | 370/330 |

* cited by examiner

```
DPC AGENT PROGRAM 1.50
┌─────────────────────────────────────────────────────────┐
│                   Login Script Editor                    │
│  Wait1: [          ]   Wait Timeout 1= 10               │
│  Send1:                                                  │
│  Wait2:                Wait Timeout 2= 5                │
│  Send2:                                                  │
│  Wait3:                Wait Timeout 3= 5                │
│  Send3:                                                  │
│  Wait4:                Wait Timeout 4= 5                │
│  Send4:                                                  │
│  Wait5:                Wait Timeout 5= 5                │
│  Send5:                                                  │
│  Wait6:                Wait Timeout 6= 5                │
│  Send6:                                                  │
│  Wait7:                Wait Timeout 7= 5                │
│  Send7:                                                  │
│  Wait8:                Wait Timeout 8= 5                │
│  Send8:                                                  │
│  Wait9:                Wait Timeout 9= 5                │
│  Send9:                                                  │
├─────────────────────────────────────────────────────────┤
│ Modem Status:   IDLE              Tx☐  Rx☐  Cd☐        │
│ Package Status: IDLE                                     │
│ Select an Option  <Enter>     Users 50  Keys☐ Signal☐   │
└─────────────────────────────────────────────────────────┘
```

Fig. 10g-1

```
DPC AGENT PROGRAM 1.50
┌─────────────────────────────────────────────────────────┐
│              Provider Configuration Editor               │
│            Outbound Protocol = Modem - PPP               │
├─────────────────────────────────────────────────────────┤
│                  PPP Configuration Editor                │
│  Authentication User Name:                               │
│  Authentication Password :                               │
│                                                          │
│  Maximum Receive Unit    : [1400]                       │
│  Asynch. Control Char Map: 0x0                          │
├─────────────────────────────────────────────────────────┤
│              Modify Auto Login Script                    │
│              [Modify PPP Configuration]                  │
├─────────────────────────────────────────────────────────┤
│ Modem Status:   IDLE              Tx☐  Rx☐  Cd☐        │
│ Package Status: IDLE                                     │
│ Select an Option  <Enter>     Users 50  Keys☐ Signal☐   │
└─────────────────────────────────────────────────────────┘
```

Fig. 10g-2

METHOD AND SYSTEM FOR ASYMMETRIC SATELLITE COMMUNICATIONS FOR LOCAL ARE NETWORKS WHEREIN THE SERVER BEING PROGRAMMED TO ROUTE THE DOWNLOADED DATA TO CLIENT COMPUTERS IRRESPECTIVE OF THE CLIENT COMPUTER'S OPERATING SYSTEMS

I. BACKGROUND OF THE INVENTION

A. Related Applications

This application is a Continuation of U.S. patent application Ser. No. 09/746,438, filed Dec. 20, 2000, which is a Continuation of U.S. patent application Ser. No. 08/943,544, now U.S. Pat. No. 6,205,473 B1, filed Oct. 3, 1997.

B. Reference to Microfiche Appendix.

A microfiche appendix, containing three microfiche and 150 total frames is filed herewith. The microfiche appendix includes the computer source code of one preferred embodiment of the invention.

C. Field of the Invention.

This invention relates to methods and systems for communications between computers and other digital information devices. More particularly, this invention relates to communications between computers making use of digital satellite communications channels and computer local area networks, to provide access to the Internet, to facilitate data and software distribution, and/or to enhance the capabilities of intranet systems for computers with connections to local area networks.

D. Description of Related Art.

It is well established that computers can communicate across local or wide area networks. It is also well known that satellite receivers and transmitters can be used to transfer high volumes of digital data. Some efforts have been made to provide communication systems which can be used to transfer data between computer processors using a variety of communication mediums (see Moura et al., U.S. Pat. No. 5,586,121). However, it is desirable to provide a high-speed, low-cost, satellite-based communication system which is designed to optimize the use of digital satellite systems for local area networks (LANs). Optimizing the use of the digital satellite channel is best accomplished through the use of asymmetrical communications between the computer server and the Internet as opposed to symmetric communication, in which substantially the same data rates and the same media are used for both the transmit direction and the receive direction, and as opposed to communication systems which employ asymmetrical communication between the local area network and the server. Particularly, asymmetrical systems require upstream router hardware, "backbone" network hardware, or dial-up Internet service providers (ISPs) to create a "hybrid" asymmetrical local system with a symmetrical local area network. Since calls to the Internet can efficiently be made at relatively low speeds, and since using digital satellites as a communication medium provides the capability of very high speed responses from the Internet, an asymmetric transmission from the Internet across the digital satellite to the LAN server provides the greatest system efficiency.

The most common method of sending and receiving computer information today is a land line service (i.e., a switched service, a dedicated line, and/or an analog modem, each using telephone wire lines). However, such a system encounters many problems, including slow transmission speeds, high access costs, lack of available wire lines, and Internet congestion.

Satellite communication receivers are commonly used to create or supplement existing private wide area data and video networks. When used as an extension to a data network, these satellite links may interconnect local area networks. Satellite links can provide many advantages over land line service, including potentially high speed data transmission and wide availability. However, typical satellite links have required expensive hardware both to transmit and to receive data. The expense of the hardware has made the use of satellite communication channels generally unavailable to those who most need it.

This invention addresses these issues by providing a method and system for providing the advantages of satellite communications for high volume download data packets and typically using a relatively low speed land line for the low volume upload data request packets. By capitalizing on the asymmetrical nature of Internet dataflow, this invention provides an efficient solution for LAN to satellite Internet communications.

For general background material the reader is directed to U.S. Pat. Nos. 5,095,480, 5,379,296, 5,423,002, 5,488,412, 5,534,913, 5,539,736, 5,541,911, 5,541,927, 5,555,244, 5,583,997, 5,586,121, 5,594,872, 5,610,910, 5,610,920, 5,631,907, 5,659,692, 5,668,857, 5,673,265, each of which is hereby incorporated by reference in its entirety for the material disclosed therein.

II. SUMMARY OF THE INVENTION

This invention is a method and system for efficiently communicating between networked computers using a high speed satellite communications channel. It is an object of this invention to provide a high speed satellite based information delivery system for local area network connectivity to the Internet, for file, data, software, and/or multimedia distribution.

It is a further object of this invention to provide a data transmission system particularly well suited to remote location and/or locations where access to high speed data mediums is unavailable or prohibitively expensive.

It is a further object of this invention to provide a high speed data transmission system that utilizes a highly flexible and adaptable software method.

It is a further object of this invention to provide a high speed data transmission system that communicates with the Internet while being Internet service provider (ISP) independent.

It is a further object of this invention to provide a high speed data transmission system that makes use of digital satellite communications technology to enhance data bandwidth, channel reliability, and accessibility.

It is a further object of this invention to provide a high speed data transmission system that utilizes a software method capable of operating on a wide range of server operating systems, including Windows 95, Windows NT, NetWare, Linus, Macintosh, present and future versions and the equivalents.

It is a still further object of this invention to provide a high speed data transmission system that is compatible with a wide range of communication protocols and/or mediums, including ISDN, T1, modem, dedicated phone line, switched phone line, frame relay and ATM.

It is another object of this invention to provide a method for permitting many client computer systems, which may be operating system independent and operating on one or more local area networks, to communicate over a single satellite dish, at very high data rates.

It is a further object of this invention to provide a method using software which can operate on a wide variety of hardware, operating system, and software platforms, including, but not limited to: Macintosh, Linux, Unix, OS/2, and Windows NT.

These and other objects of this invention are readily apparent to individuals of ordinary skill in the art upon further study of the drawings, detailed description, claims and abstract that are included in this patent disclosure.

III. BRIEF DESCRIPTION OF THE DRAWINGS

FIGS. 10a–k provide various screen shots demonstrating the user interface of the invention.

IV. DETAILED DESCRIPTION OF THE INVENTION

This invention is a system and method for asymmetric communications between a remote information provider and a client computer system residing on a local area network (LAN), using high bandwidth digital satellite communication channels. The preferred embodiment of the method of the invention is performed in software residing on a local computer system. The current preferred embodiment of the method software is written in Intel 386 assembly code, C and C++ computer languages. The reader is directed to the computer software microfiche appendix for a complete disclosure of the software making up the current best mode of the method of this invention. Alternatively, those of ordinary skill in the art could practice this method in a wide variety of procedures, computer languages, or even in dedicated electronic hardware. Therefore this patent should not be read to be limited to the specific embodiment of the provided software microfiche appendix. Rather, this software source code is provided to fully describe one preferred embodiment of the method of this invention. Also, in its preferred embodiment, this invention performs in association with DirectPC satellite receivers, Novell NetWare network software, and standard off-the-shelf computer hardware. Other alternative satellite receiver systems, networking software and computer hardware could easily be substituted by those of ordinary skill in the art without departing from the essence of this invention. Similarly, the preferred embodiment, described in the following detailed description, includes a number of components and method steps which may not be absolutely necessary in other embodiments of the invention. The reader is, therefore, directed to the claims for a description of the range of this patent.

Figure 1:
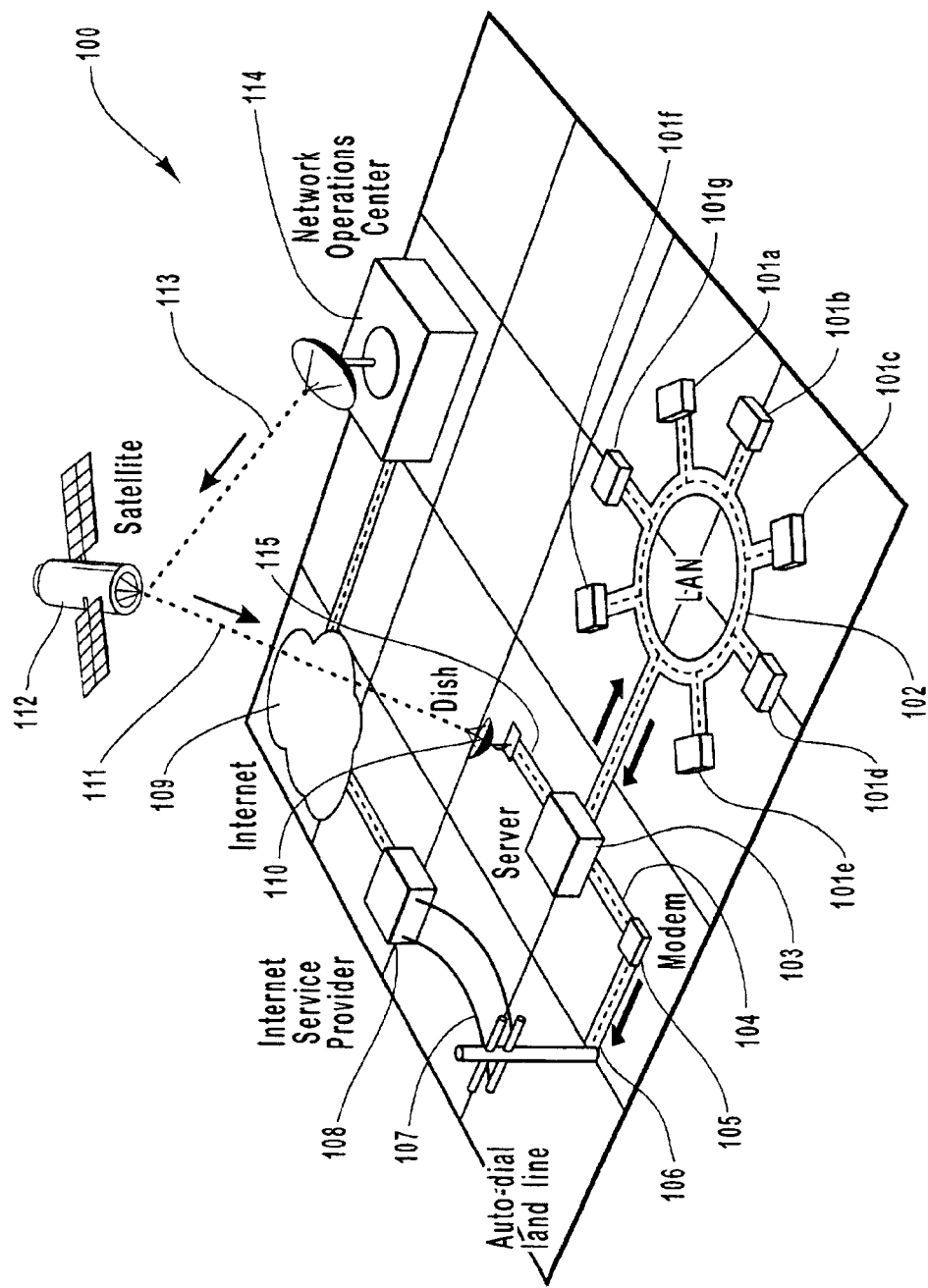
FIG. 1 depicts a top level rendering of the major component parts of the communication system invention.

FIG. 1 depicts a top level rendering of the major components and communication paths constituting the system 100 of this invention. A client computer 10a–g is shown clustered with other client computers on a local area network (LAN) 102. The client computer 101 uses standard off-the-shelf commercially available software, while the server provides the user interface to the desired information. The LAN 102 provides the means for communicating from the client computer 101 to a server 103, which provides the communication interface outside the LAN. The server 103 receives data from a digital satellite receiver 110, depicted here as a satellite dish, across a signal antenna waveguide 115. The digital satellite receiver 110 receives the digital information from a downlink channel 111, which is transmitted from a geosynchronous satellite 112. The satellite 112 receives the information from a network operations center 114 via an uplink channel 113. The server 103 generally uses the above described communications channel from the network operations center 114 for downloads of information, such as Internet web page data, software updates, data file distributions and other similar data packages. Alternatively and in addition, this invention provides the capability of using another satellite communication channel to send requests from the client computer 101 to the network operations center 114. This is a particularly useful feature for access from remote locations. Use of the satellite communication channel provides important benefits to the information requestor at the client computer 101, including very high speed data transfer, the ability to receive broadcast software distributions which in turn means the requestor is likely to receive such distributions in a more timely and cost effective manner, and the ability to have Internet access from locations where wired communications channels, such as telephone lines, are either unavailable, overly burdened, or prohibitively expensive.

FIG. 1 also shows the preferred, and more typical request communications channel. In this preferred request channel the client computer 101, connected through the LAN 102, through the server 103, sends a request via modem 105, which typically is connected to the server via a standard serial RS-232 cable 104. The modem 105 in turn is connected to standard telephone land lines 107 via a standard phone cable 106. The request is passed across the land lines 107 to the Internet service provider 108, which communicates to the Internet 109.

This invention is designed to be highly flexible and adaptable to different client computer 101 configurations, both hardware and software as well as with and to a wide variety of communication interfaces. Computer hardware such as personal computers, workstations, mini computers, mainframe computers and special purpose computational equipment can be functional client computers 101 as intended within this patent specification. Similarly, computer system operating systems which are supported and used in the preferred and alternative embodiments of this invention included but are not limited to: Windows 3.1, Windows 95, Windows NT, Macintosh, Linux, Unix, OS/2, NetWare, their current versions, past versions, and equivalent future versions and the equivalent. Communications interfaces that are or can alternatively be used with or as a part of this invention include routers, ethernet, ISDN equipment, switched 56, T1, Token Ring, frame relay, modems, satellite and the equivalent.

The advantage of this preferred mode of operation is that the communication channels are used in the most efficient manner. Typically, request packets are relatively small and can be transferred with minimal impact across land lines. While downloaded packets can be very large with significant amounts of highly concentrated graphics. For the vast majority of client computer 101 users the limitation of the Internet or the ability to receive other downloaded file information is the time it takes for the download transfer to be accomplished. This problem is solved by transferring the potentially very large downloaded packets (files, graphics, and other information) using the high bandwidth satellite channel.

Figure 2:
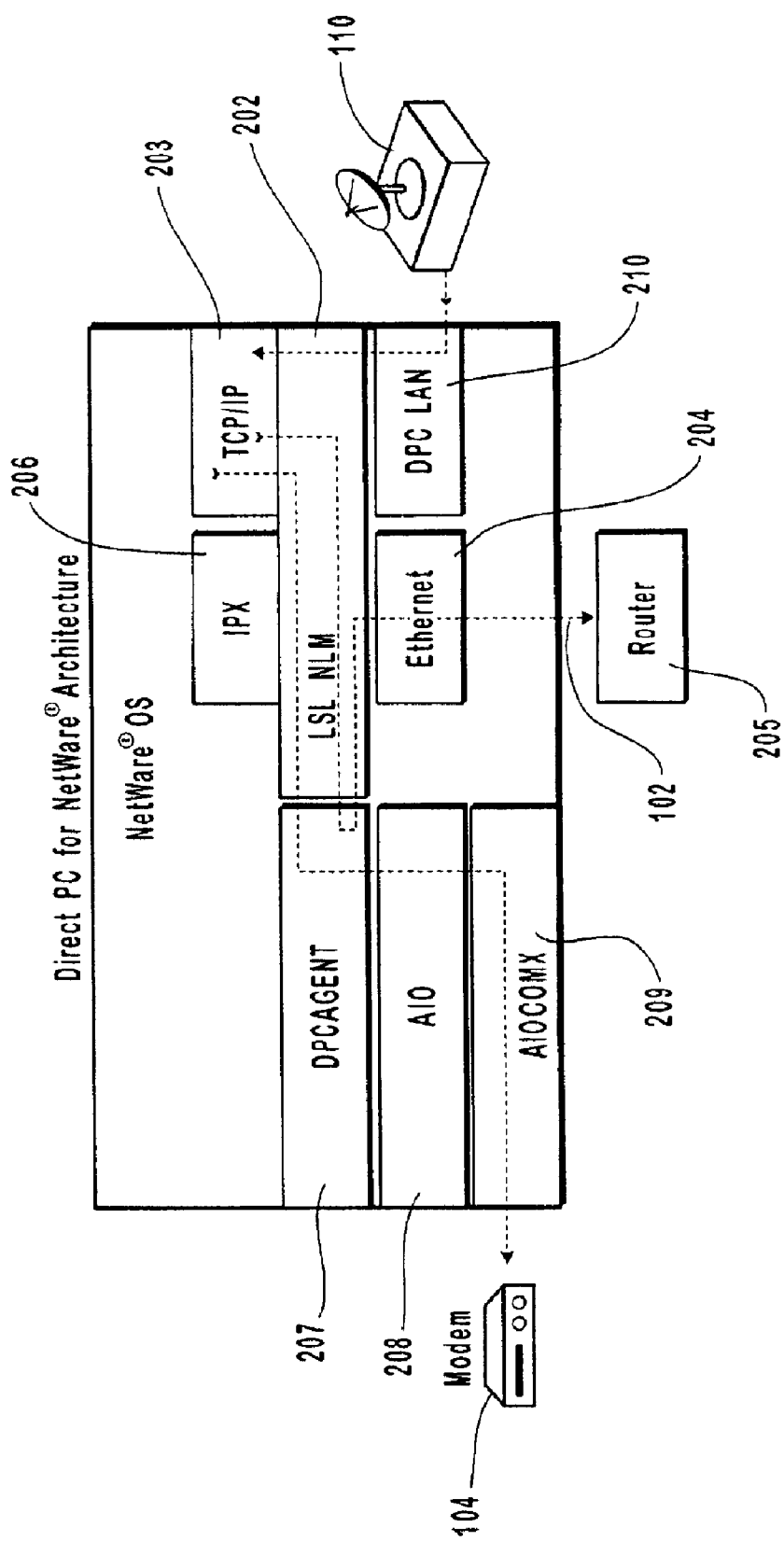
FIG. 2 depicts a preferred embodiment of the architecture of the invention.

FIG. 2 depicts a preferred embodiment of the software architecture of the invention. As shown, in its preferred embodiment, this software operates in association with several standard commercially available software packages and protocols, including Novell NetWare, Ethernet, Token Ring, TCP/IP, IPX and AIO. This software method of the invention also makes use of certain commercially available hardware components, as shown in FIG. 2, including: the satellite receiver 110, a network router 205 and a modem 104. The reader should understand that this FIG. 2 presents a single simplified embodiment of the invention. Alternative embodiments could use alternative software packages and protocols, as well as different or multiple hardware components. FIG. 2 also shows a single embodiment of the path of information through the various software and hardware components. Download information packets are received by the satellite receiver 110, which in turn communicates electronically with the DPC LAN 210, a commercially available hardware driver. The information next passes through the LSL NLM 202, a routine commercially provided by Novell Incorporated which acts as an intermediary between the driver and the protocol stack to control information packet transfer. Next, the TCP/IP 203 protocol stack receives the information packet. The TCP/IP 203 protocol stack is capable of communicating alternatively with a modem 104, via the LSL NLM 202; the DPCAGENT 207 routine, core to this invention; the AIO 208, a Novell product for managing serial communications; and through the AIO-COMX 209, which is the asynchronous input/output interface to the client computer hardware communication ports, or with router 205, via the LSL NLM 202, the DPCAGENT 207, the LSL NLM 202 and an ethernet driver 204. Alternative embodiments of this invention may make use of other standard commercially available communication protocols, drivers, hardware and software.

Figure 3:
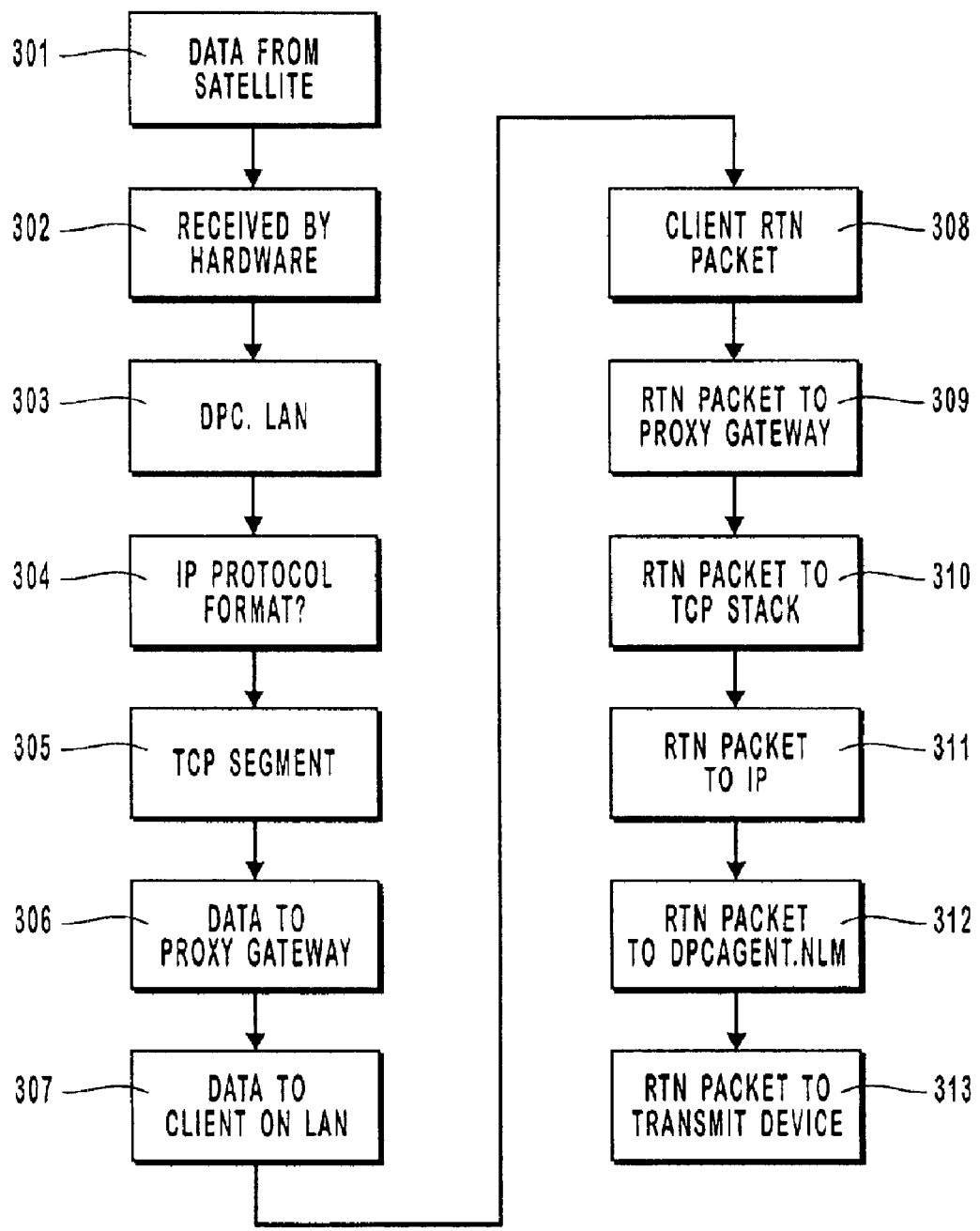
FIG. 3 depicts the preferred flow of data through the several protocol transitions in a preferred embodiment of the invention.

FIG. 3 depicts the flow of information in the preferred embodiment of the invention from the satellite 112 to the client computer 101 as well as the flow of information back to the Internet 109 from the client computer 101. Data is received 301 from the satellite 112 by the satellite receiver 10. Next, the data is transmitted to and received by the server 103 hardware 302 where it is placed in on-board memory. The DPC.LAN DirecPC network card driver retrieves the data packet from hardware memory 303. Next, if the packet is identified as an Internet protocol (IP) format packet it is delivered to the IP protocol stack 304. If the packet is identified as a transmission control protocol (TCP) segment, it is delivered to the TCP protocol stack 305. TCP delivers the data packet to a proxy gateway 306. The proxy gateway forwards the data packet to the client computer via the local area network and standard LAN protocol controllers 307. Next, the client computer processes the data and generates a return packet 308. The return packet is delivered to the proxy gateway via the local area network and the standard LAN protocol controllers 309. The return packet is forwarded to the TCP stack 310, and next to the IP stack 311. The IP delivers the return packet to the DPCAGENT.NLM process 312, which delivers the return packet data to a transmit device, such as a modem or a router 313.

Figure 4:
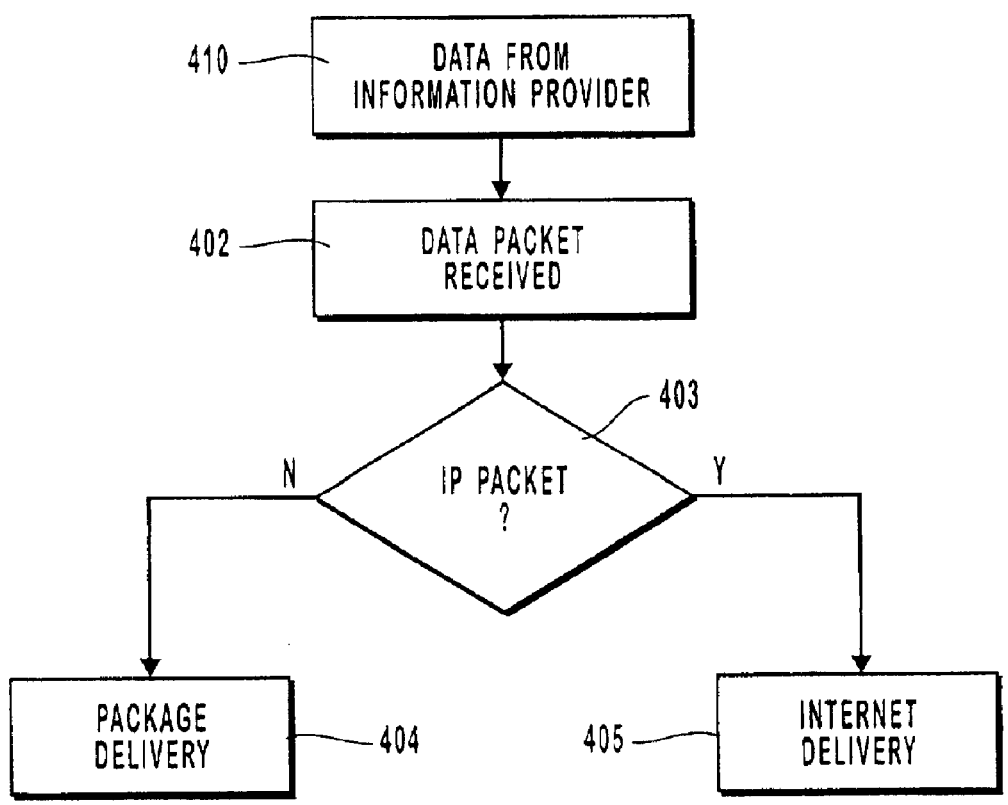
FIG. 4 depicts a top level flow diagram showing the primary steps of the process flow for an example single received data packet in the preferred method of the invention.

FIG. 4 depicts a top level flow chart rendering of the major steps of the process flow for a single downloaded data packet section of the invention. Initially the downloaded packet is received 410 by the DirecPC circuit card. This circuit card next transfers the packet data to the DPC.LAN routine 402. In the preferred embodiment of the invention, as shown in the source code appendix, the DPC.LAN routine is denoted as DriverISR proc. This process includes the steps of setting up the RAM adapters and establishing a timestamp for the packet. Further detailed information on the functioning of this routine is found within the software microfiche appendix. Next, a test is made 403 as to whether the received data is a package delivery or an Internet delivery. If the received data is package data, it is delivered 404. Package data delivery includes and provides the capabilities of simultaneously broadcasting software upgrades or data files to many client computers, potentially throughout any one continent. Client computers can also request the package data delivery service to retrieve a package of information through the client accessible interface of the invention. If the received data is Internet data, then Internet data delivery is made 405. Additional detail on steps 404 and 405 follows in this specification.

Figure 5:
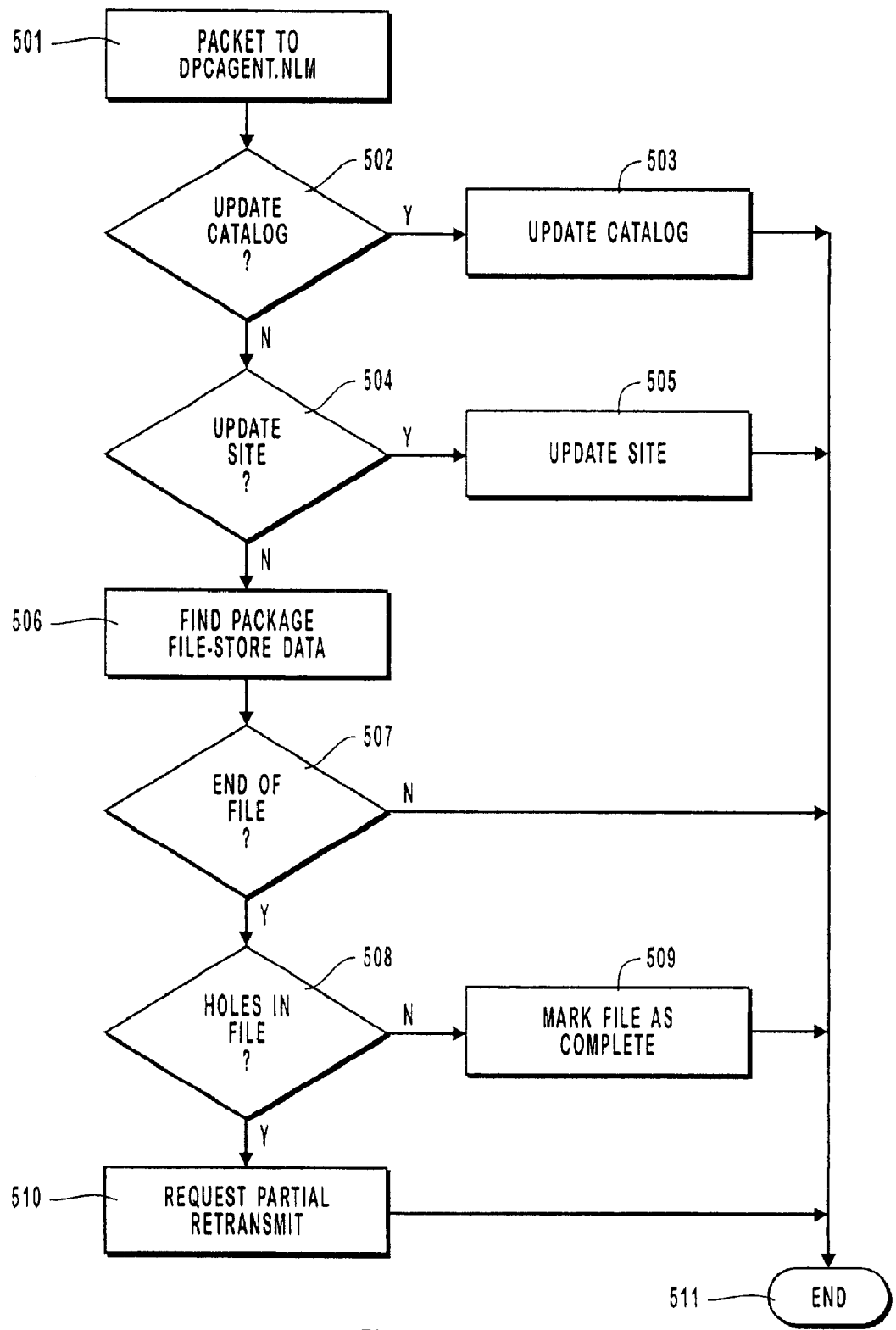
FIG. 5 depicts a detailed flow diagram showing the package delivery major step of the preferred embodiment of the invention.

FIG. 5 depicts a detailed flow chart of the preferred embodiment of the package delivery major step of the method of the invention. The data packet is transferred to the DPCAGENT.NLM process 501. This process is a NetWare Loadable Module (NLM) process running on NetWare. After the data packet is received 501, a test is made to determine whether the packet will update the catalog 502. If the catalog will be updated, then it is updated 503 using off-the-shelf commercially available software and the process of package delivery for that packet ends 511. If, however, the catalog will not be updated, then a test is performed to determine whether the site will be updated by the data packet 504. Site updates include modification of such site parameters as NOC versioning, encryption key updates, and becoming a member of a group or leaving a group. If the site will be upgraded, then the process performs the upgrade of the site parameters 505, and the process for this packet ends 511. If the site will not be updated, then the package file is found and stored on the server disk 506. A test is then made to determine whether the end-of-file has been encountered 507. If the end-of-file has not been encountered then the process for that packet ends 511. However, if the end-of-file has been encountered, then a test is made to determine whether there are any "holes" in the file, that is whether the file is incomplete 508. If no holes are found in the file, it is marked as complete 509 and the process for this packet ends 511. If "holes" are found in the file, then a request for partial retransmit of the missing packet is sent 510, at which point the process for this packet ends 511.

Figure 6:
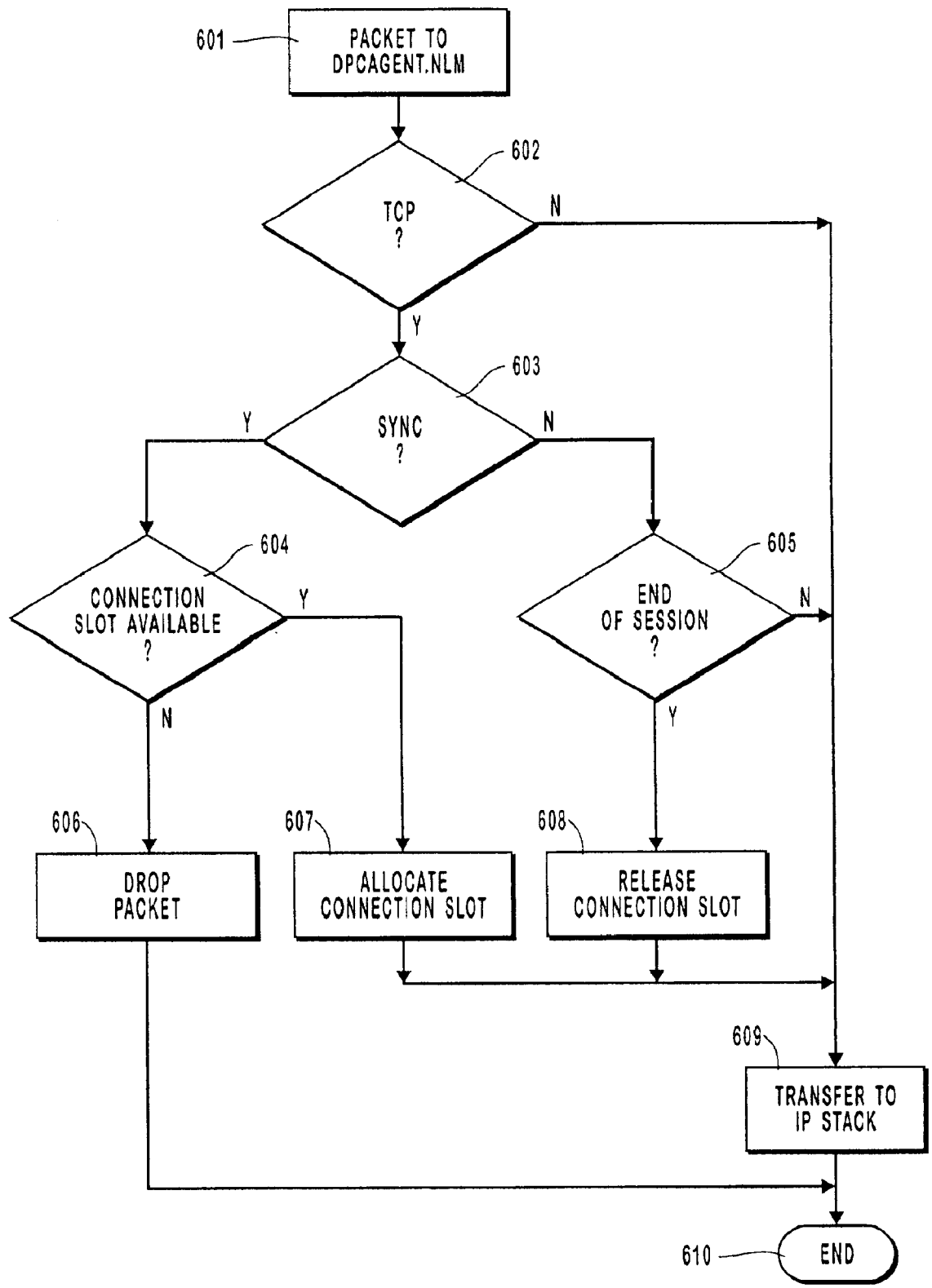
FIG. 6 depicts a detailed flow diagram showing the Internet protocol (IP) major step of the preferred embodiment of the invention.

FIG. 6 depicts a detailed flow chart of the preferred embodiment of the Internet protocol delivery major step of the method of the invention. Internet package delivery OR Internet Protocol (IP) delivery is a major function of the invention providing the capability of receiving large files from an Internet source at a very high speed. First the data packet is transferred to the DPCAGENT.NLM routine 601. A test is made to determine whether the data is in transmission control protocol (TCP) 602. If the data is not in TCP protocol then the data packet is transferred to the Internet Protocol (IP) stack 609 and the process for this data packet ends 610. If the data is in TCP form then a test is made to determine if a "SYN" or beginning of section is being initiated 603. If no "SYN" is detected, then a test is made to determine if an end of session, commonly a FIN or RST command, has been encountered 605. If no such end of session is found, then the data packet is transferred to the IP stack 609 and the process for this packet is ended 610. If, however, a "SYN" is detected, then the inquiry is made as to whether a connection slot is available 604. Connection slots perform the function of managing the number of subscribers permitted to have access to the communication network at a given time. If a connection slot is available, it means that the customer still has client computer access capacity. If a connection slot is available, a connection slot is allocated 607 and the data packet is transferred to the IP stack 609 and the process ends. If it is determined that a connection slot is not available, then the data packet is dropped or discarded 606 and the process for this packet ends 610.

Figure 7:
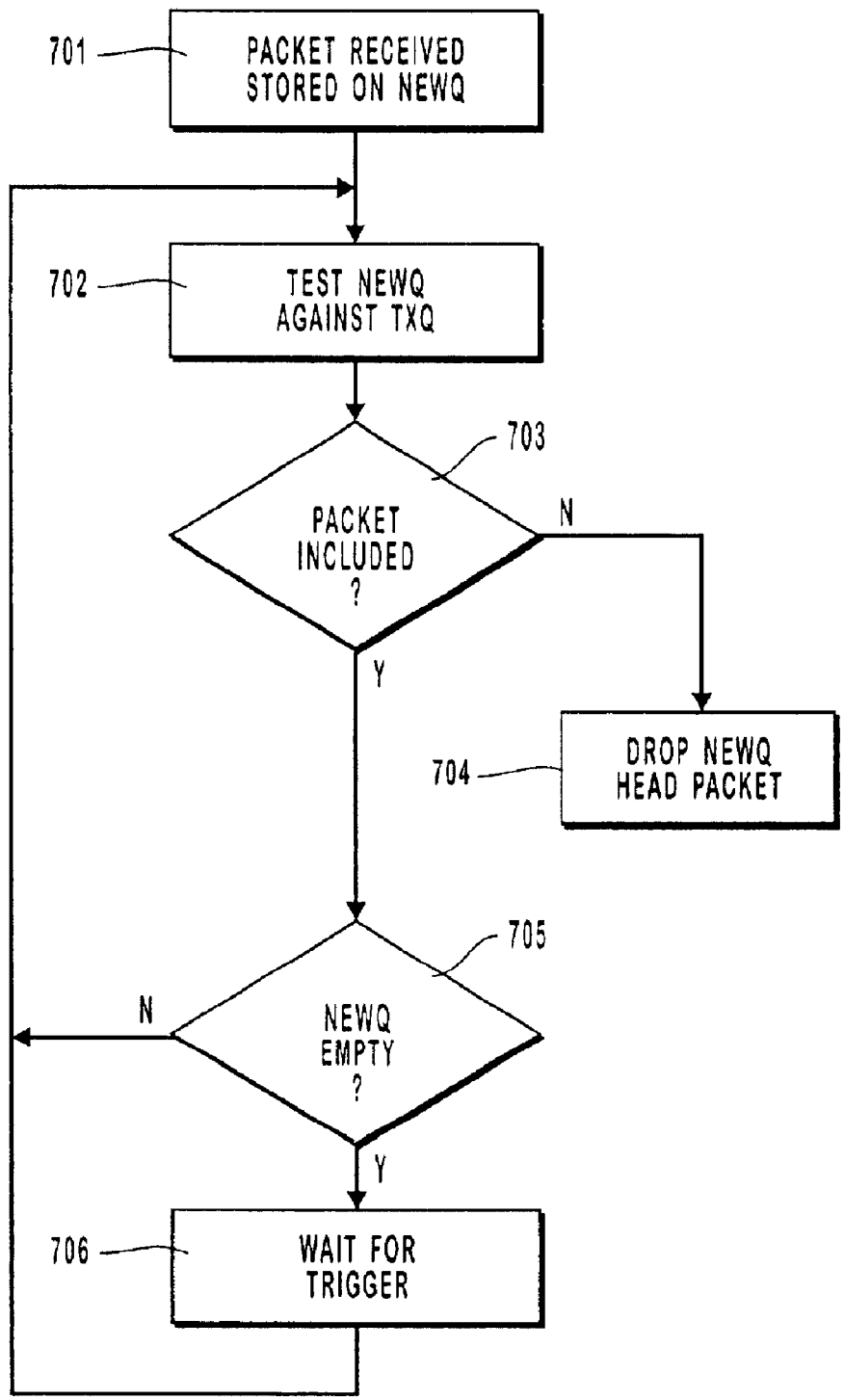
FIG. 7 depicts a top level flow diagram showing the primary steps of the process flow for an example transmission of Internet protocol datagrams.

FIG. 7 depicts a top level flow chart showing the primary steps of the preferred embodiment of the transmission of Internet protocol datagrams (or packets) method steps of the invention. Packets that are received from the IP stack are stored on the NewQ 701. Next the packet is removed from the NewQ and tested against each and every packet on the TxQ to determine if any TxQ data is redundant or dated and should be replaced 702. If a comparison of the packet with the TxQ packets finds the updated or "newer" information, then the TxQ packet data is replaced by the current packet data. This approach is essential to maintaining the fairness of the TxQ packet transfers while ensuring that good data is transmitted thereby improving the transmission efficiency of the system. A test is performed to determine if the packet was included in the TxQ 703. If the packet was not included then the current or NewQ head packet is dropped or discarded 704. Otherwise, if the packet was included, a test is performed to determine if the NewQ is empty 705. If the NewQ is not empty, the process returns to the test NewQ step where a new NewQ head packet is compared against the TxQ. If, however, the NewQ is empty, then the process enters a wait state 706 where a trigger that is meeting a specified condition, such as new packet on the NewQ or exit command, is required before the process restarts at the testing step 702.

Figure 8:
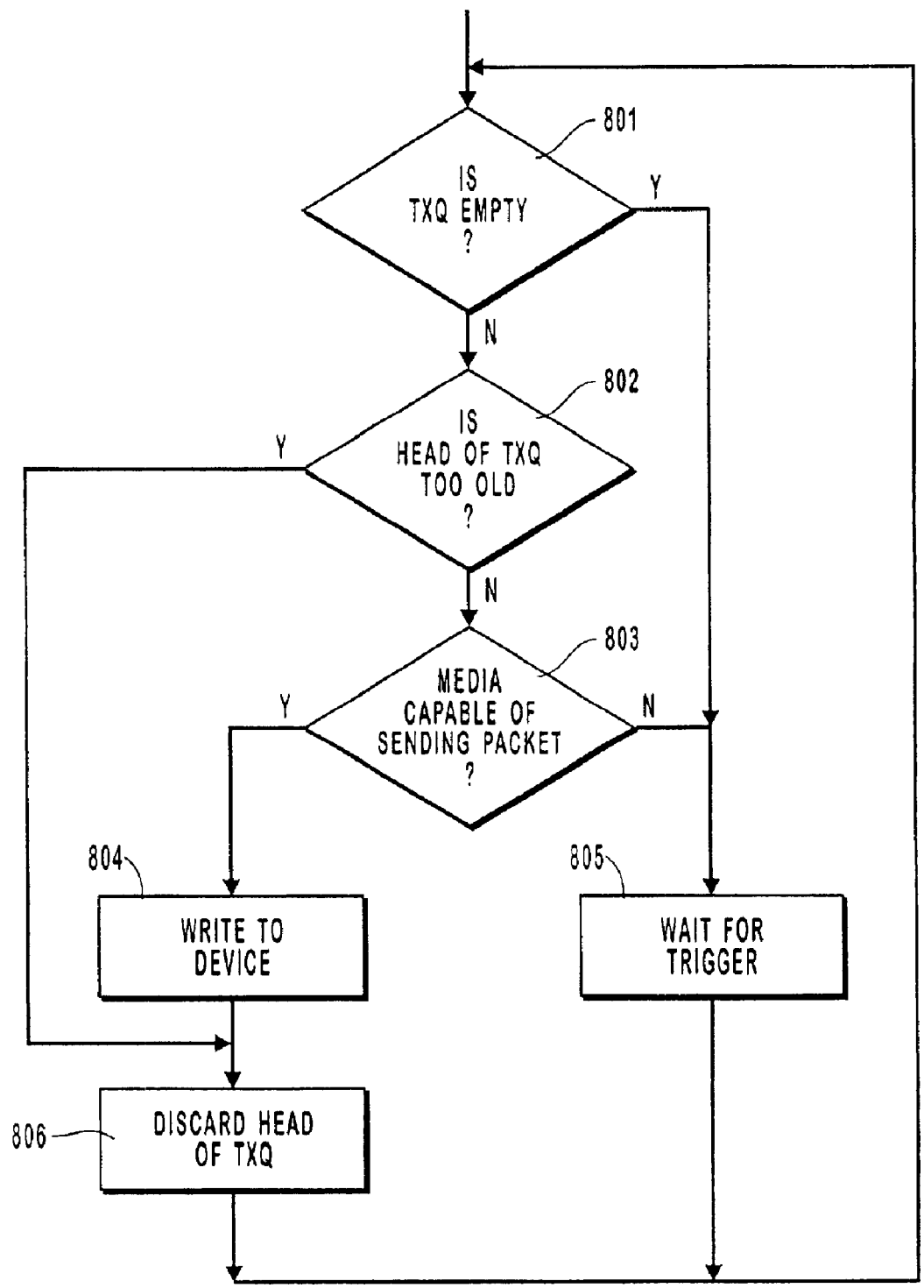
FIG. 8 depicts additional detail showing the transfer queue (TxQ) thread processing of the filter queue step of the transmission portion of the invention.

FIG. 8 depicts a detailed flow chart showing the transfer queue (TxQ) thread processing steps of the transmission portion of the invention. In the preferred embodiment of the invention processing the TxQ and processing the NewQ are independent threads of the program which are capable of running independently on one or more computer processors. In processing the TxQ it is first determined whether the TxQ is empty 801. If the TxQ is empty, then the process enters a wait state 805 where a trigger, such as a polling timer, a transmission complete signal, or an exit command, is required to resume processing. Note that in the preferred embodiment of the invention the expected wait time is calculated in this step and the polling time is initiated. If the TxQ is not empty, a test is made to determine if the head packet of TxQ is too old 802. In the preferred embodiment of the invention, too old is defined as a packet that has been in the TxQ for more than sixty (60) seconds. Alternative embodiments could employ any practicable time period. If the TxQ head packet is too old, then it is discarded 806 and the process returns to the TxQ empty test 801. If the TxQ head packet is not too old, then a test is made to determine if the media, or communication conduit, is capable of transferring another packet of data 803. If the media is capable of transferring another packet, then the packet is written to the transmission device 804, otherwise, the process enters the wait state 805 and waits for a trigger as described above.

Figure 9:
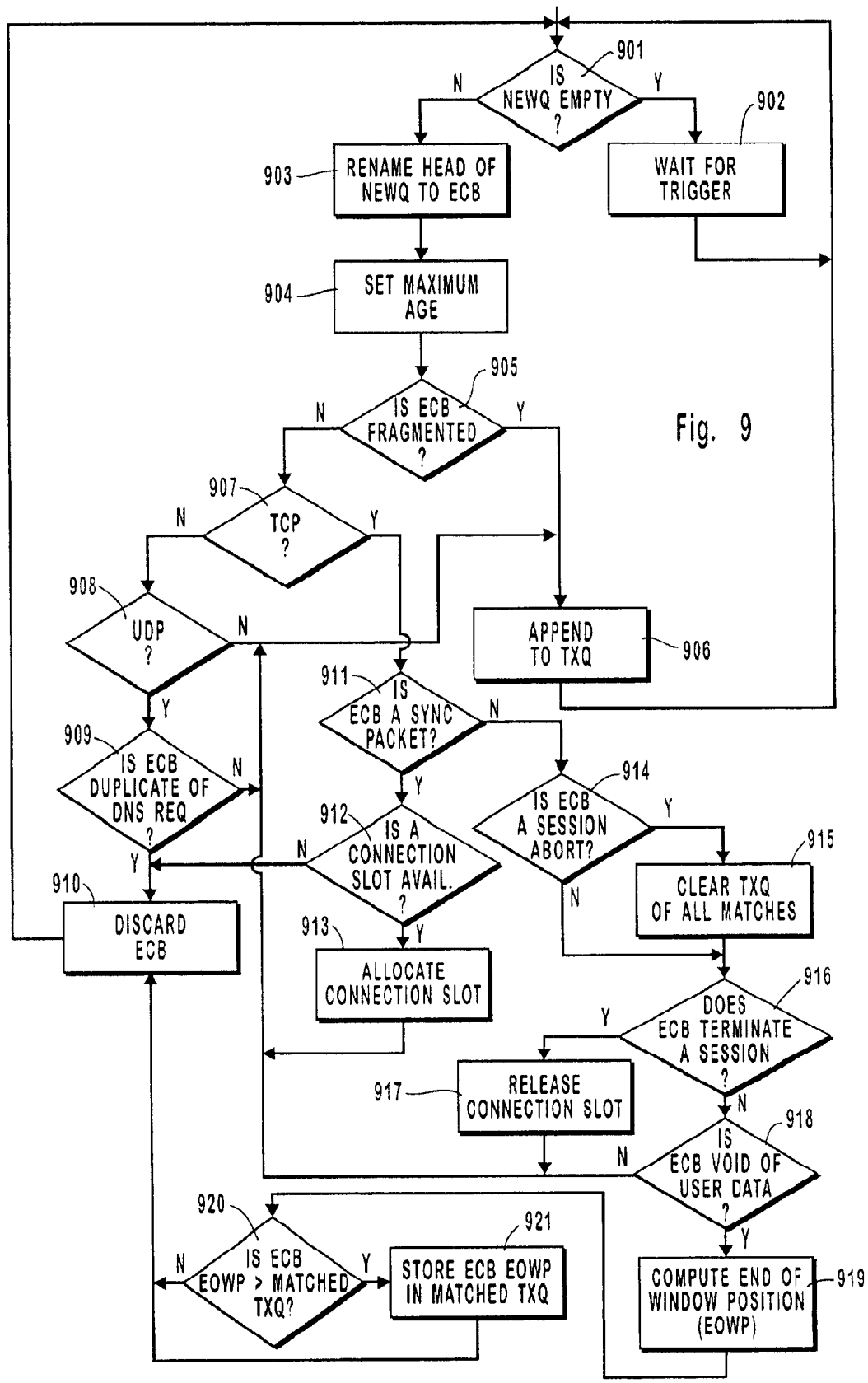
FIG. 9 depicts additional detail showing new queue (NewQ) thread processing of the filter queue step of the transmission portion of the invention.

FIG. 9 depicts a detailed flow chart showing the new queue (NewQ) thread processing steps of the filter queue step of the transmission portion of the invention. The filter queue processing step of the invention, which is the core of step 702, is important in providing the communication efficiency which is one of the key objectives of this invention. A test is made to determine whether the NewQ is empty 901. If the NewQ is empty then a wait state is entered 902 where a trigger, such as new packet available in NewQ, exit or timer count, is required to resume the process. If NewQ is not empty, then the head of NewQ is renamed as ECB 903, a packet holding variable. The maximum age of the ECB packet is set 904 and a test is performed to determine if the ECB packet is fragmented 905, that is whether ECB is only a partial packet, which in the current best mode of the invention is not inspected. If ECB is fragmented, then it is appended 906 to the TxQ for transmission. If ECB is not fragmented, then a test is performed to determine if it is a TCP packet 907. If it is not a TCP packet, then the test is made to determine if it is a UDP packet 980. If it is not a UDP packet or a TCP packet then it is appended to the TxQ for transmission 906. If, however, it is a UDP packet, a test is made to determine if ECB is a duplicate of a DNS request 909. If ECB is not a duplicate of a DNS request, then the packet is appended to TxQ 906. If ECB is a duplicate of the DNS request, then it is discarded 910 and the process returns to testing to see if NewQ is empty 901. If it is a TCP packet, then a test is made to determine if ECB is a "SYN" or beginning of session packet 911. If ECB is a "SYN" packet, then a test of whether a connection slot is available is made 912. If a connection slot is available it is allocated 913. If, however, a connection slot is unavailable ECB is discarded 910. If ECB is not a "SYN" packet then the test is made to determine if ECB is a session abort packet (RST) 914. If ECB is found to be a session abort packet TxQ is cleared of all matching packets 915 and a test is made to determine if ECB will terminate a session 916. If ECB is not a session abort then the step of clearing all matching packets 915 is skipped. If the ECB is found to terminate a session, then the connection slot is released 917. A test is then performed to determine if ECB is void of user data 918. If it contains user data then it is appended to TxQ 906. Otherwise, the End-of-Window-Position (EOWP) is computed 919 and a test is made to determine if ECB's EOWP is greater than the matched TxQ packets 920, if not ECB is discarded 910, and if so, ECB has its EOWP stored in matched TxQ 921 and then ECB is discarded 910.

Figures 1, 10A:
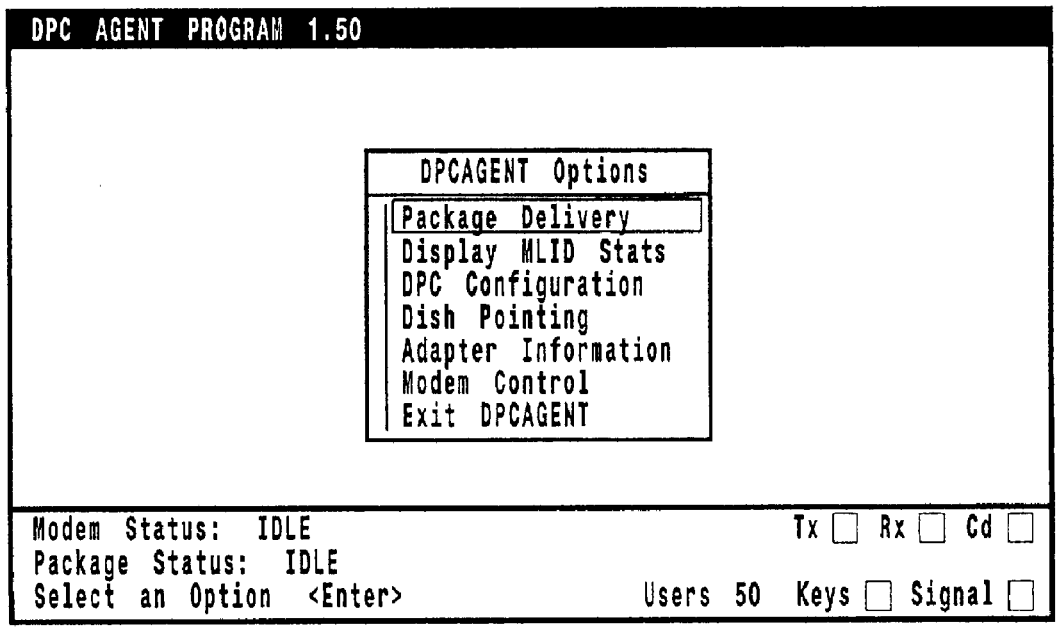
Figures 2, 10A:
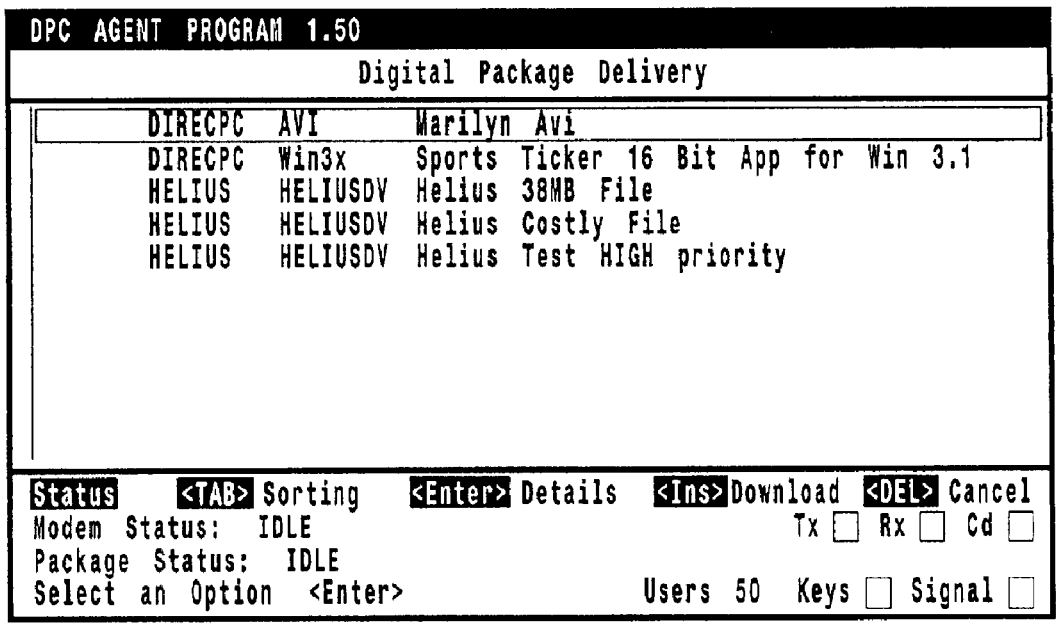
Figures 1, 10B:
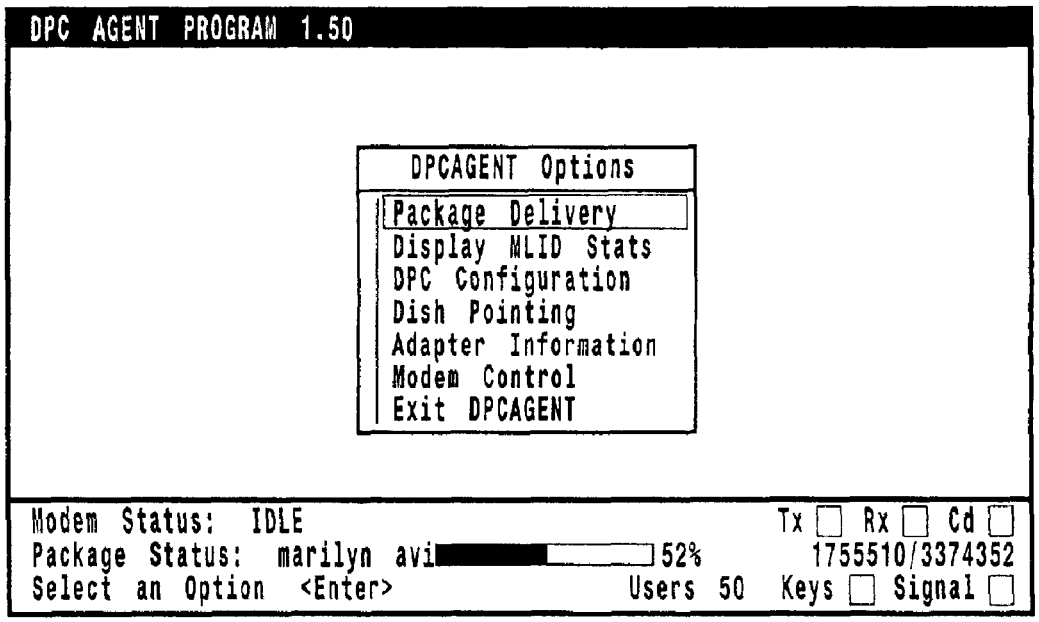
Figures 2, 10B:
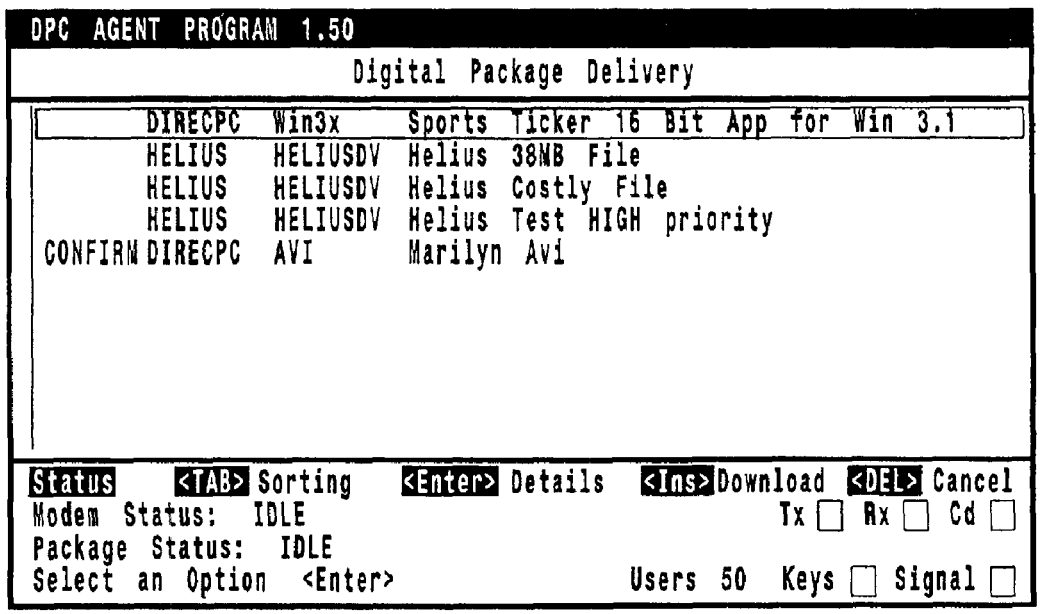
Figures 1, 10C:
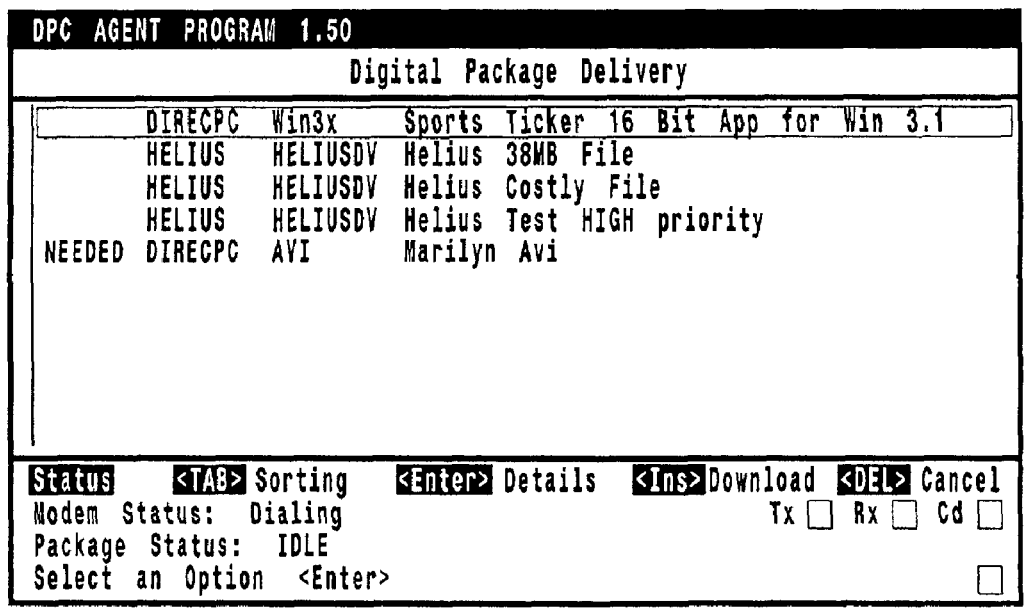
Figures 2, 10C:
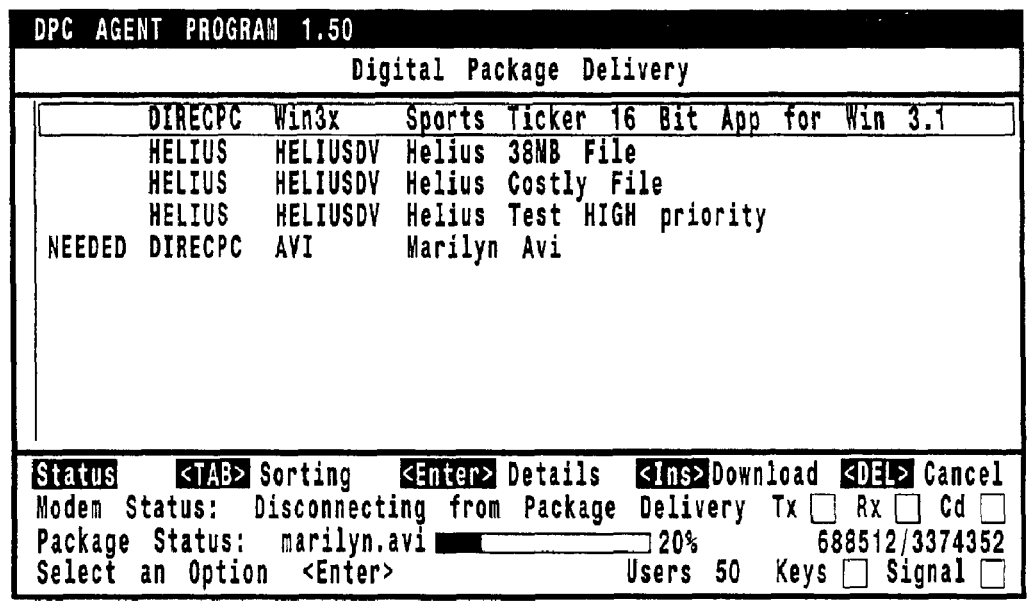
Figures 1, 10D:
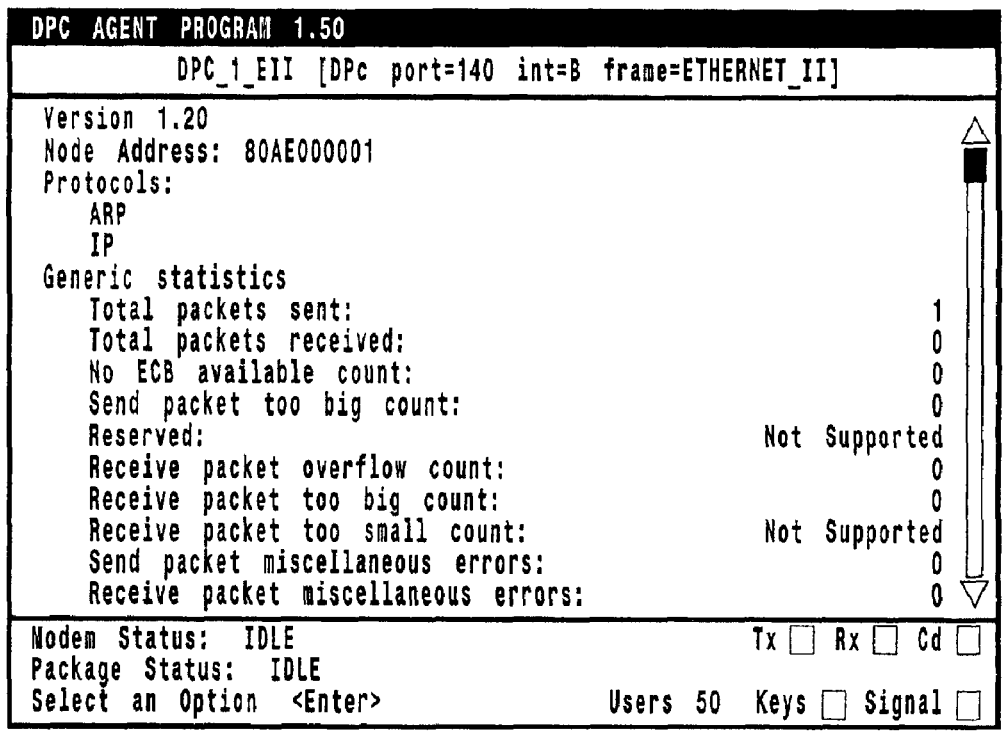
Figures 2, 10D:
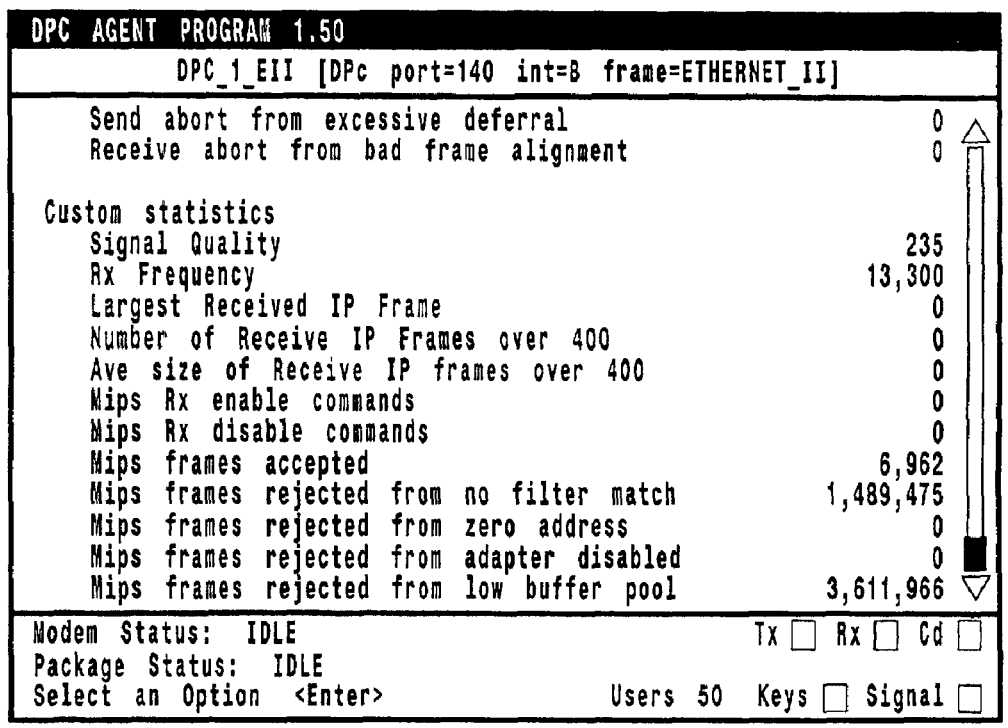
Figures 1, 10E:
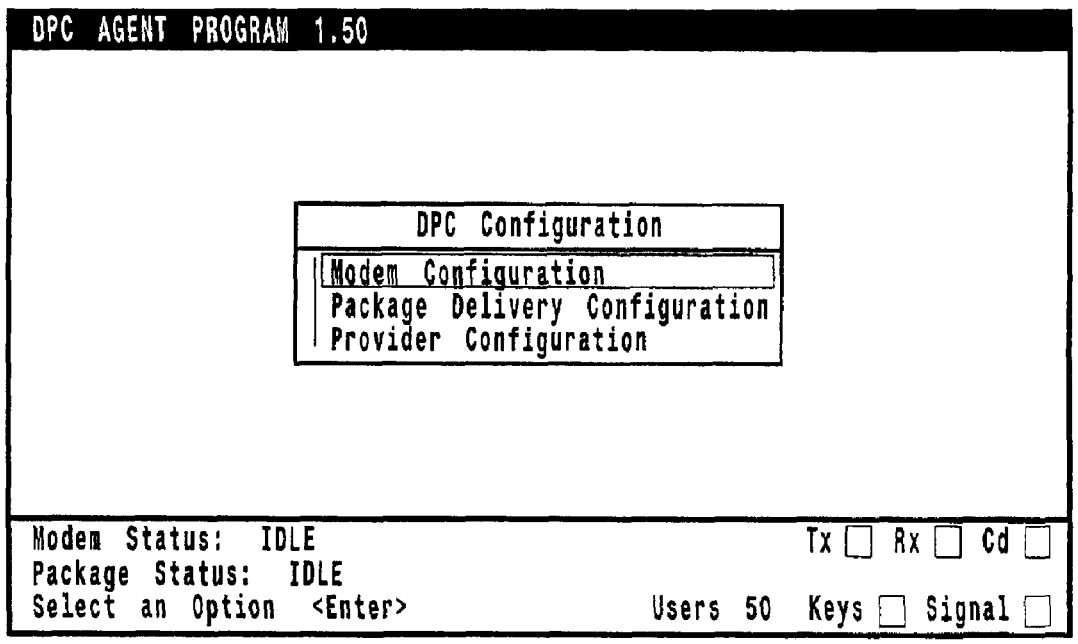
Figures 2, 10E:
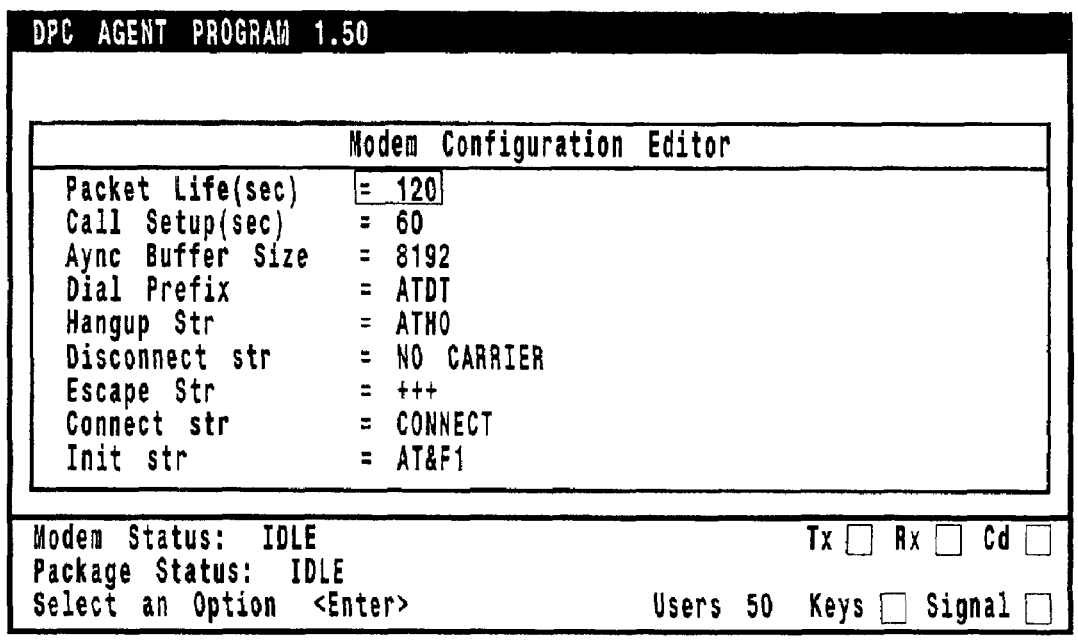
Figures 1, 10F:
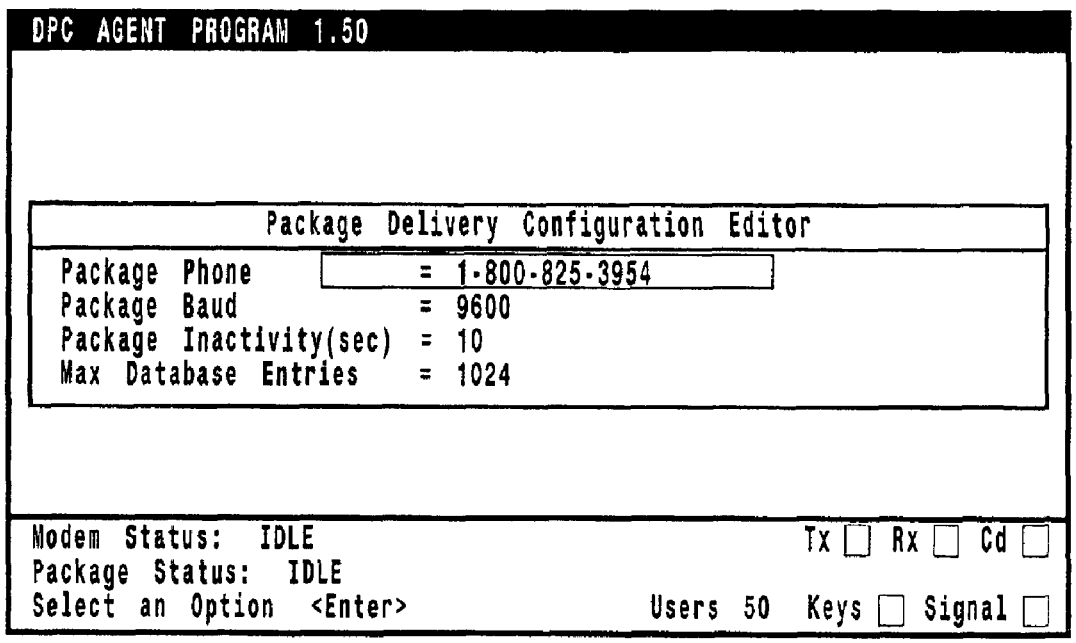
Figures 2, 10F:
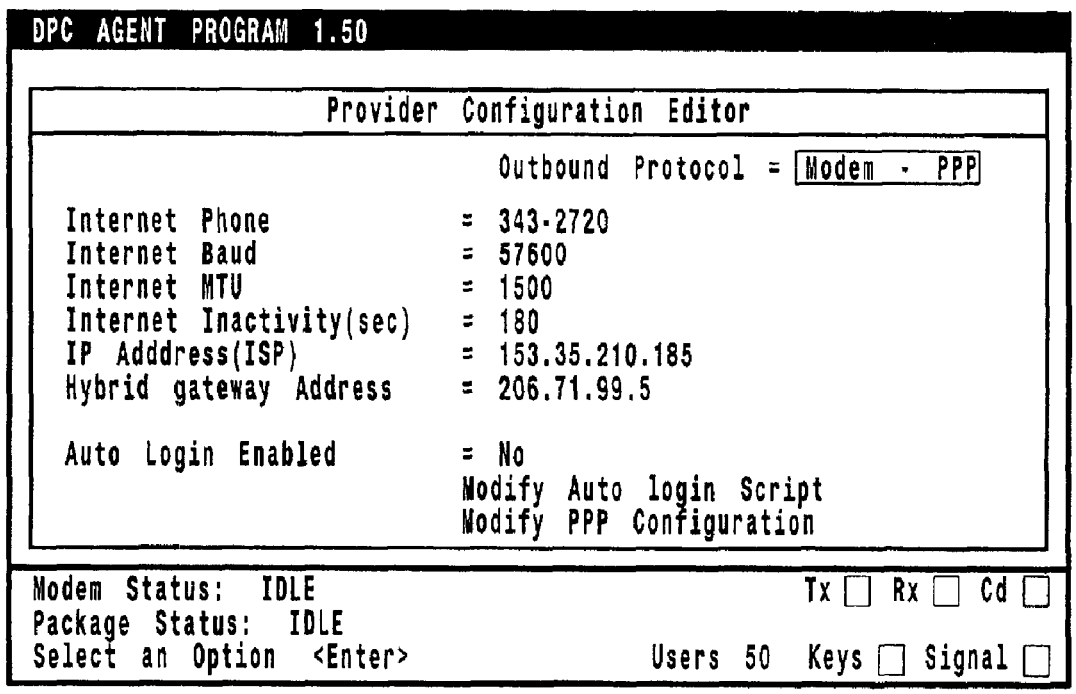
Figures 1, 10H:
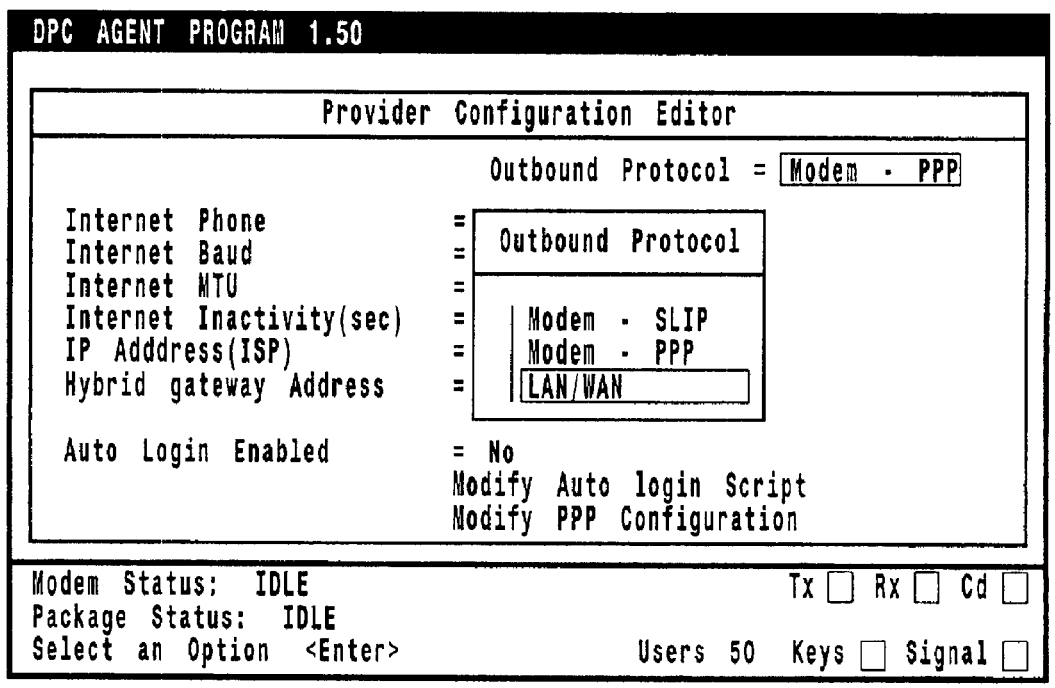
Figures 2, 10H:
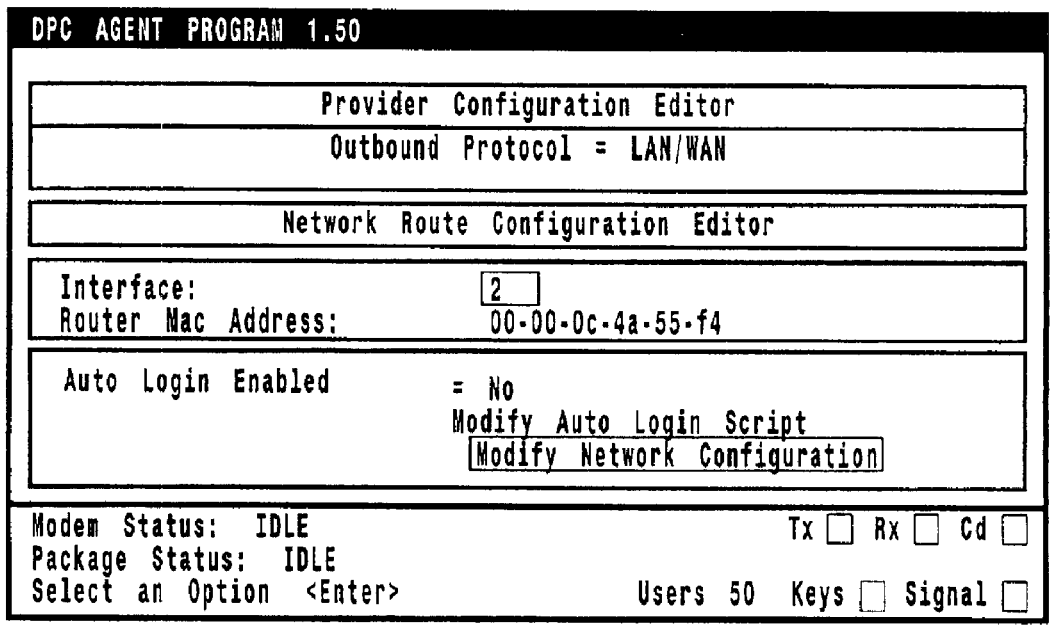
Figures 1, 10I:
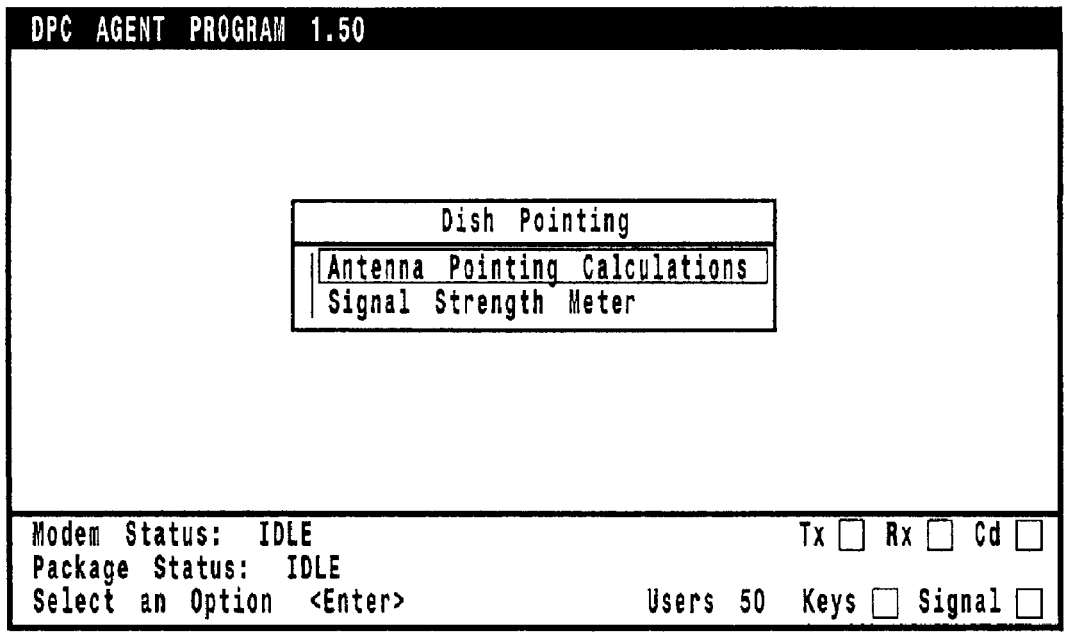
Figures 2, 10I:
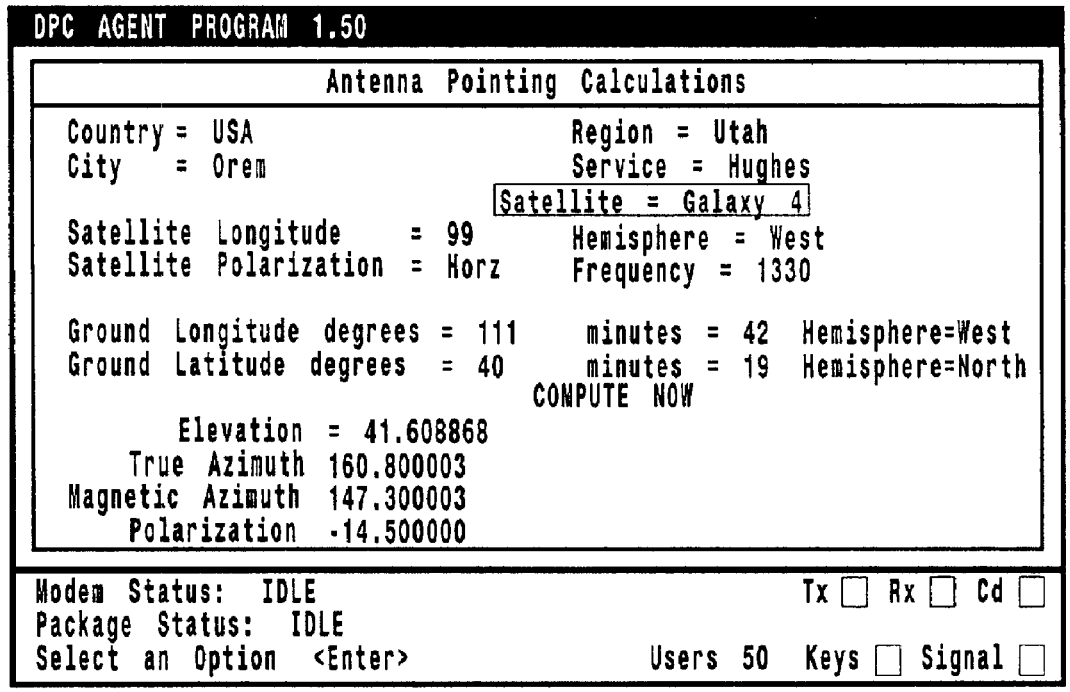
Figures 1, 10J:
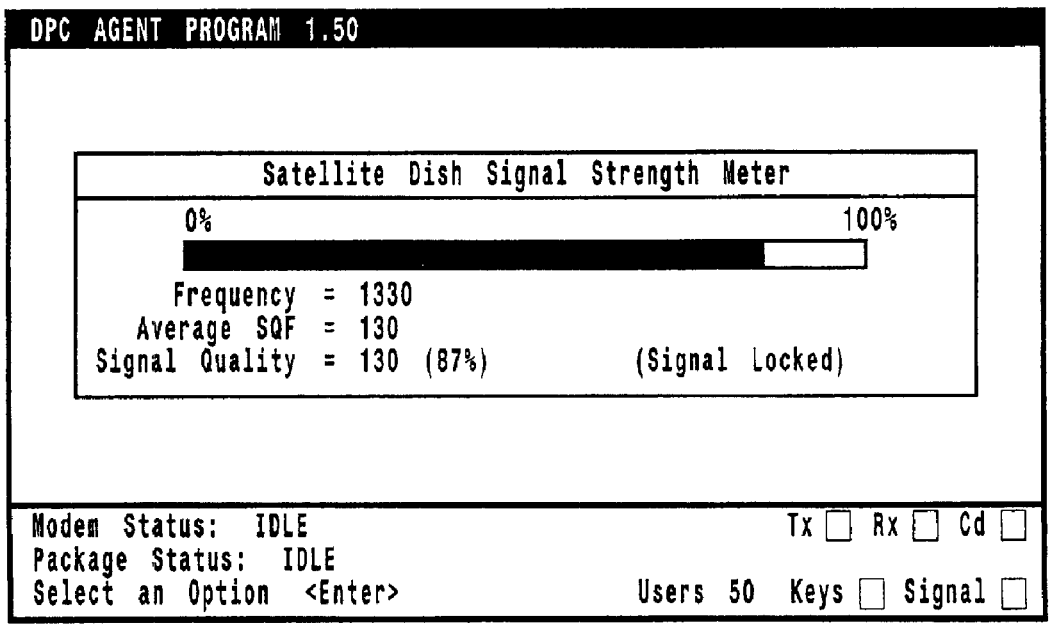
Figures 2, 10J:
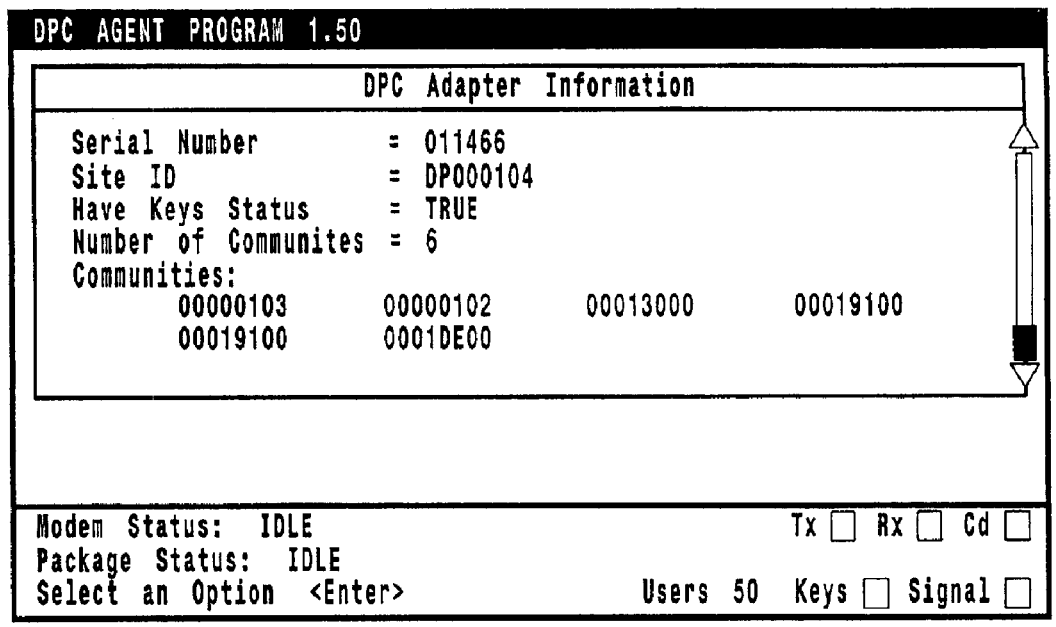
Figure 10K:
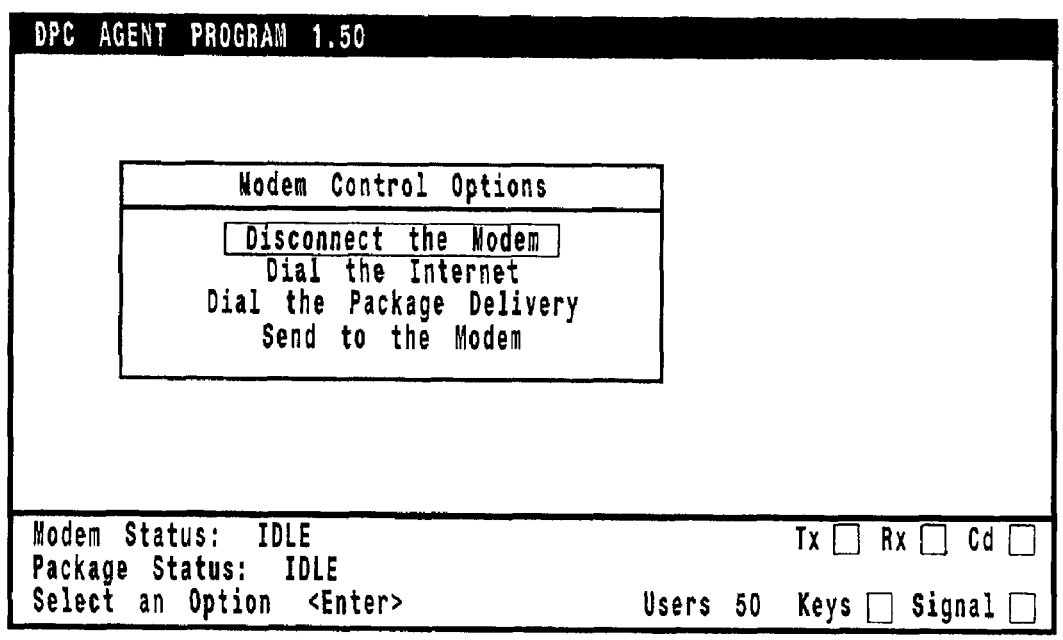

FIGS. 10*a*–*k* show various screen shots demonstrating the user interface of the invention. FIG. 10*a* shows the DPCAGENT routine options for user selection as well as the digital package delivery queue screen. FIG. 10*b* shows a package of data in transit as displayed on the user screen. FIG 10*c* shows the main screen of the package delivery interface. FIG. 10*d* shows package statistics as displayed for user information. FIG. 10e shows configuration control screens where the user can modify certain modem, package delivery and provider configuration information. FIG. 10f shows the package delivery configuration editor screens with the information that can be user modified. FIG. 10g shows the login script editor and the provider configuration editor. FIG. 10h shows additional provider configuration editor screens showing the configuration of an outbound protocol case. FIG. 10i shows the dish or antenna pointing adjustments screens. FIG. 10j shows the satellite dish signal strength meter for dish alignment. FIG. 10k shows the adapter information screen, here showing site information including the card hardware serial number, the site identification, the status of keys, and a list of communities or groups in which the user is participating.

We claim:

1. A communications system for communicating between an information provider and at least one client computer on a computer network, the system comprising:

a satellite receiver operating to receive download data from the information provider;

a plurality of client computers on a computer network each of said client computers including first network hardware and first network software for communication with the information provider; and a server computer, including second network hardware and second network software for communications with the computer network, in electronic communication with said satellite receiver and in electronic communication with the computer network, said server computer having satellite receiver interface software installed thereon operating to receive the download data from said satellite receiver and operating to route the download data to said plurality of client computers for use by the application software on each of said client computers, via the computer network, in order to provide the advantages of satellite communications for high volume download data packets; and said server computer network being programmed to route the download data to client computers on the computer network irrespective of the client computer's operating systems such that said server computer does not require the same operating system for each client computer of the plurality of client computers; and wherein said satellite receiver interface software further comprises the steps of: setting up RAM adapters; establishing a timestamp for a received packet; testing whether said received packet is a package delivery or an Internet delivery; if said received packet is a package delivery, testing to determine if said packet will update a catalog, testing to determine if a site will be updated by said packet; determining whether an end-of-file has been encountered; determining if a file within said packet is incomplete; and if said file is not incomplete marking said file as complete.

2. The communications system as defined in claim 1 wherein said computer network is a local area network.

3. The communications system as defined in claim 1 wherein said computer network is a wide area network.

4. The communications system as defined in claim 2 further comprising a storage medium wherein said server computer's routing of the download data includes storing the download data on said storage medium.

5. The communications system as defined in claim 4 wherein said storage medium is included in said server computer.

6. The communications as defined in claim 4 wherein said storage medium is an intermediate storage medium and wherein the download data is stored on said intermediate storage medium prior to receipt of the download data by said at least one of said plurality of client computers.

7. The communications system of claim 6 wherein said intermediate storage medium includes a cache.

8. The communications system of claim 2 wherein said server computer runs a server operating system.

9. The communications system of claim 2 wherein said server computer routes the download data using a standard local area network protocol.

10. The communications system as defined in claim 2 wherein said server computer operates to route the download data to a plurality of local area networks.

11. A server computer for communicating between a global communications network and at least one client computer on a computer network, the server computer comprising:

network hardware for connecting said server computer to the computer network;

communications hardware for enabling electronic communications with a satellite receiver operating to receive download data which is then sent to a client computer by the server computer via a computer network in order to provide the advantages of satellite communications for high volume download data packets;

a processor; and a computer readable medium containing:

network instructions for communications between said server computer and the computer network;

satellite receiver interface software instructions for communications between said server computer and the satellite receiver;

router instructions, said router instructions operating to receive download data from the global communications network and operating to route the download data to at least one client computer on the computer network irrespective of the client computer's operating systems such that said server computer does not require the same operating system for each client computer of the plurality of client computers, and wherein said routing instructions further comprise: setting up RAM adapters; establishing a timestamp for a received packet; testing whether said received packet is a package delivery or an Internet delivery; if said received packet is a package delivery, testing to determine if said packet will update a catalog, testing to determine if a site will be updated by said packet; determining whether an end-of-file has been encountered; determining if a file within said packet is incomplete; and if said file is not incomplete marking said file as complete; and wherein said network instructions, said satellite instructions and said router instructions are executable by said processor.

12. The server computer as defined in claim 11 wherein said computer network is a local area network.

13. The server computer as defined in claim 11 wherein said computer network is a wide area network.

14. The server as defined in claim 12 further comprising a storage medium wherein said server computer's routing of the download data includes storing the download data on the storage medium.

15. The server computer as defined in claim 14 wherein said storage medium is included in said server computer.

16. The server computer as defined in claim 14 wherein said storage medium is an intermediate storage medium and wherein the download data is stored on said intermediate storage medium prior to receipt of the download data by said at least one client computer.

17. The server computer as defined in claim 16 wherein said intermediate storage medium includes a cache.

18. The server computer as defined in claim 12 wherein said server computer runs a server operating system.

19. The server computer as define din claim 12 wherein said server computer routes the download data using a standard local area network protocol.

20. The server computer as defined in claim 12 wherein said server computer operates to route the download data to a plurality of local area networks.

21. A method for providing access to a global communications network for at least one client computer on a computer network, which comprises:
receiving download data from a satellite receiver in electronic communication with a server computer, said server computer having satellite receiver interface software installed thereon and said satellite receiver operating to receive download data; and
routing said received download data to at least one client computer via the computer network, in order to provide the advantages of satellite communications for high volume download data packets, irrespective of the client computer's operating systems such that said server computer does not require the same operating system for each client computer of the plurality of client computers, wherein said routing further comprises: setting up RAM adapters; establishing a timestamp for a received packet; testing whether said received packet is a package delivery or an Internet delivery; if said received packet is a package delivery, testing to determine if said packet will update a catalog, testing to determine if a site will be updated by said packet; determining whether an end-of-file has been encountered; determining if a file within said packet is incomplete; and if said file is not incomplete marking said file as complete.

22. The method as defined in claim 21 wherein said computer network is a local area network.

23. The method as defined in claim 21 wherein said computer network is a wide area network.

24. The method as defined in claim 21 wherein the server computer further comprises a storage medium and wherein said server computer's routing of the download data includes storing the download data on said storage medium.

25. The method as defined in claim 24 wherein said storage medium is an intermediate storage medium and wherein the download data is stored on said intermediate storage medium prior to receipt of the download data by said at least one client computer.

26. The method as defined in claim 25 wherein said intermediate storage medium includes a cache.

27. The method as defined in claim 21 wherein said server computer runs a server operating system.

28. The method as defined in claim 21 wherein said server computer routes the download data using a standard local area network protocol.

29. The method as defined in claim 21 wherein said server computer operates to route the download data to a plurality of computer networks.

30. A computer readable medium containing instructions for providing access to a global communications network for at least one client computer on a computer network, wherein the instructions comprise executable instructions for implementing a method comprising:
receiving download data from a satellite receiver in electronic communication with a server computer, said server computer having satellite receiver interface software installed thereon, and said satellite receiver operating to receive download data; and
routing said received download data to at least one client computer via the computer network, in order to provide the advantages of satellite communications for high volume download data packets, irrespective of the client computer's operating system such that said server computer does not require the same operating system for each client computer, wherein said routing further comprises: setting up RAM adapters; establishing a timestamp for a received packet; testing whether said received packet is a package delivery or an Internet delivery; if said received packet is a package delivery, testing to determine if said packet will update a catalog, testing to determine if a site will be updated by said packet; determining whether an end-of-file has been encountered; determining if a file within said packet is incomplete; and if said file is not incomplete marking said file as complete.

31. The computer-readable medium as defined in claim 30 wherein said computer network is a local area network.

32. The computer-readable medium as defined in claim 30 wherein said computer network is a wide area network.

33. The computer-readable medium as defined in claim 30 wherein the server computer further comprises a storage medium and wherein said server computer's routing of the download data includes storing the download data on said storage medium.

34. The computer-readable medium as defined in claim 33 wherein said storage medium is an intermediate storage medium and wherein the download data is stored on said intermediate storage medium prior to receipt of the download data by said at least one client computer.

35. The computer-readable medium as defined in claim 34 wherein said intermediate storage medium includes a cache.

36. The computer-readable medium as defined in claim 30 wherein said server computer runs a server operating system.

37. The computer-readable medium as defined in claim 31 wherein said server computer routes the download data using a standard local area network protocol.

38. The computer-readable medium as defined in claim 30 wherein said server computer operates to route the download data to a plurality of computer networks.

39. A method for providing access to a global communications network for a client computer, which comprises:
receiving download data from a satellite receiver in electronic communication with a server computer, said server computer having satellite receiver interface software installed thereon; and
routing the download data from said satellite receiver to a client computer on a network, in order to provide the advantages of satellite communications for high volume download data packets, irrespective of the client computer's operating system such that said server computer does not require the same operating system for each client computer, wherein said routing further comprises: setting up RAM adapters; establishing a timestamp for a received packet; testing whether said received packet is a package delivery or an Internet delivery; if said received packet is a package delivery, testing to determine If said packet will update a catalog, testing to determine if a site will be updated by said packet; determining whether an end-of-file file has been encountered; determining if a file within said packet is incomplete; and if said file is not incomplete marking said file as complete.

40. The method as defined in claim 39 wherein the server computer further comprises a storage medium and wherein said server computer's routing of the download data includes storing the download data on said storage medium.

41. The method as defined in claim 40 wherein said storage medium is an intermediate storage medium and wherein the download data is stored on said intermediate storage medium prior to receipt of the download data by said client computer.

42. The method as defined in claim 41 wherein said intermediate storage medium includes a cache.

43. The method as defined in claim 39 wherein said server computer runs a server operating system.

44. The method as defined in claim 39 wherein said server computer routes the download data using a standard local area network protocol.

* * * * *